US012769123B2

(12) United States Patent
Danziger et al.

(10) Patent No.: US 12,769,123 B2
(45) Date of Patent: Oct. 20, 2026

(54) ENCAPSULATED LIGHT-GUIDE OPTICAL ELEMENTS FOR NEAR EYE DISPLAY

(71) Applicant: Lumus Ltd., Ness Ziona (IL)

(72) Inventors: Yochay Danziger, Kfar Vradim (IL); Eitan Ronen, Rechovot (IL); Amir Shapira, Ness Ziona (IL); Ido Fuchs, Ness Ziona (IL); Edgar Friedmann, Sdey-Avraham (IL); Aviv Frommer, Yokneam Moshava (IL)

(73) Assignee: LUMUS LTD., Ness Ziona (IL)

( * ) Notice: Subject to any disclaimer, the term of this patent is extended or adjusted under 35 U.S.C. 154(b) by 257 days.

(21) Appl. No.: 18/287,465

(22) PCT Filed: Jun. 9, 2022

(86) PCT No.: PCT/IL2022/050621
§ 371 (c)(1),
(2) Date: Oct. 19, 2023

(87) PCT Pub. No.: WO2022/264123
PCT Pub. Date: Dec. 22, 2022

(65) Prior Publication Data

US 2024/0231099 A1 Jul. 11, 2024

Related U.S. Application Data

(60) Provisional application No. 63/324,164, filed on Mar. 28, 2022, provisional application No. 63/251,918,
(Continued)

(51) Int. Cl.
*G02B 27/01* (2006.01)
*G02B 6/42* (2006.01)

(52) U.S. Cl.
CPC ....... *G02B 27/0172* (2013.01); *G02B 6/4206* (2013.01)

(58) Field of Classification Search
CPC .................................................. G02B 27/0172
See application file for complete search history.

(56) References Cited

U.S. PATENT DOCUMENTS 6,829,095 B2 12/2004 Amitai
7,576,916 B2 8/2009 Amitai
(Continued)

FOREIGN PATENT DOCUMENTS

CN 110146982 8/2019
CN 209417423 U 9/2019
(Continued)

OTHER PUBLICATIONS

Japanese Office Action for JP2022800423083.5 Mailed On Jul. 30, 2026.

*Primary Examiner* — Edmond C Lau
(74) *Attorney, Agent, or Firm* — Rivka Friedman

(57) ABSTRACT

An optical device has an LOE formed from a light-transmitting material having a first refractive index. A pair of parallel major external surfaces of the LOE guide image illumination within the LOE by TIR. At least one optical coupling configuration of the LOE deflects a proportion of the image illumination that is guided within the LOE by TIR. An optical material includes at least one transparent material directly attached to the LOE at least at the major external surfaces so as to be in direct contact with the major external surfaces and so as to at least partially encapsulate the LOE. The optical material has a second refractive index less than the first refractive index to maintain conditions of TIR at the major external surfaces. In certain embodiments, the TIR-guided image illumination is incident to the major external surfaces at angles greater than a critical angle, including shallow angles.

14 Claims, 12 Drawing Sheets

Related U.S. Application Data filed on Oct. 4, 2021, provisional application No. 63/210,672, filed on Jun. 15, 2021.

(56) References Cited

U.S. PATENT DOCUMENTS

| | | | |
|---|---|---|---|
| 9,387,631 | B2 | 7/2016 | Buchon et al. |
| 10,466,483 | B2 | 11/2019 | Quere et al. |
| 10,739,512 | B2 | 8/2020 | Eisenfeld et al. |
| 10,816,827 | B2 | 10/2020 | Berthelot et al. |
| 10,831,033 | B2 | 11/2020 | Reignault et al. |
| 10,845,616 | B2 | 11/2020 | Quere et al. |
| 10,890,774 | B2 | 1/2021 | Callier et al. |
| 11,150,476 | B2 | 10/2021 | Le Saux et al. |
| 11,249,237 | B2 | 2/2022 | Nakamura et al. |
| 11,561,335 | B2 | 1/2023 | Danziger et al. |
| 11,815,709 | B2 | 11/2023 | Ronen et al. |
| 2008/0273246 | A1 | 11/2008 | Moliton et al. |
| 2013/0242392 | A1 | 9/2013 | Amirparviz |
| 2016/0282622 | A1 | 9/2016 | Hiraide |
| 2018/0210202 | A1* | 7/2018 | Danziger ................. G02B 5/30 |
| 2019/0243142 | A1 | 8/2019 | TeKolste et al. |
| 2019/0278086 | A1 | 9/2019 | Ofir |
| 2020/0142196 | A1* | 5/2020 | Mills ........................ G06F 3/013 |
| 2020/0183170 | A1 | 6/2020 | Amitai et al. |
| 2020/0249482 | A1 | 8/2020 | Tinch et al. |
| 2020/0326545 | A1 | 10/2020 | Amitai et al. |
| 2020/0400941 | A1 | 12/2020 | Li et al. |
| 2021/0023802 | A1 | 1/2021 | Jouard et al. |
| 2021/0033773 | A1 | 2/2021 | Danziger et al. |
| 2021/0141141 | A1 | 5/2021 | Danziger et al. |
| 2021/0141225 | A1 | 5/2021 | Meynen et al. |
| 2021/0271006 | A1 | 9/2021 | Ronen et al. |
| 2022/0299772 | A1 | 9/2022 | Mills et al. |
| 2022/0357498 | A1 | 11/2022 | Fuchs et al. |
| 2022/0388108 | A1 | 12/2022 | Maziel et al. |
| 2022/0390747 | A1 | 12/2022 | Eisenfeld |
| 2023/0063646 | A1 | 3/2023 | Eisenberg |
| 2023/0139649 | A1 | 5/2023 | Ronen et al. |
| 2023/0417543 | A1 | 12/2023 | Eisenberg |

FOREIGN PATENT DOCUMENTS

| | | |
|---|---|---|
| CN | 215375951 U | 12/2021 |
| WO | 2021030908 | 2/2021 |

* cited by examiner

ENCAPSULATED LIGHT-GUIDE OPTICAL ELEMENTS FOR NEAR EYE DISPLAY

CROSS-REFERENCE TO RELATED APPLICATIONS

This application claims priority from U.S. Provisional Patent Application No. 63/210,672, filed Jun. 15, 2021, U.S. Provisional Patent Application No. 63/251,918, filed Oct. 4, 2021, and U.S. Provisional Patent Application No. 63/324,164, filed Mar. 28, 2022, the disclosures of which are incorporated by reference in their entirety herein.

TECHNICAL FIELD

The present invention relates to optical devices, and in particular optical devices having an encapsulated light-guide optical element.

BACKGROUND OF THE INVENTION

Optical arrangements for near eye display (NED), head mounted display (HMD) and head up display (HUD) require large aperture to cover the area where the observer's eye is located (commonly referred to as the eye motion box—or EMB). In order to implement a compact device, the image that is to be projected into the observer's eye is generated by a small optical image generator (projector) having a small aperture that is multiplied to generate a large aperture. Aperture multiplication (expansion) can be achieved in various ways. One set of solutions for achieving aperture multiplication employ a light-guide optical element (LOE), and have been described in various publications by Lumus Ltd (Israel). In some example solutions, image illumination from the image projector is injected into the LOE so as to propagate through the LOE by total internal reflection at external surfaces of the LOE. The propagating illumination is progressively coupled out of the LOE towards an observer's eye either by use of obliquely angled partial reflectors or by use of a diffractive optical element on one surface of the LOE.

SUMMARY OF THE INVENTION

Embodiments of the present invention provide encapsulated light-guide optical elements (LOEs), optical devices having encapsulated LOEs, methods of fabricating optical devices having encapsulated LOEs, and methods of encapsulating LOEs. Each LOE of the disclosed embodiments is formed from a light-transmitting material, having a first refractive index, that supports propagation of image illumination by total internal reflection at a pair (and in certain embodiments two pairs) of planar parallel major external surfaces of the LOE, and includes at least one optical coupling configuration for redirecting/deflecting some of the propagating image illumination. The LOE is at least partially encapsulated at the major external surfaces in a capsule formed from optical material having a second refractive index that is less than the first refractive index so as to maintain conditions of total internal reflection at the major external surfaces of the LOE. The optical material (also referred to as low index material) is directly attached to the major external surfaces such that no intervening materials or substances (including air) are present between the low index material. As a result, the encapsulation is an air-gap free encapsulation. The low index material includes at least one transparent low index material. In certain embodiments, the low index material consists only of a single transparent low index material. In other embodiments, the low index material includes two adjacently placed transparent low index materials. In yet other embodiments, the low index material includes a transparent low index material and an adjacently placed light-absorbing low index material.

In certain preferred embodiments, the LOE is configured to perform one-dimensional aperture expansion, whereas in other preferred embodiments the LOE is configured to perform two-dimensional aperture expansion. In embodiments in which the LOE performs two-dimensional aperture expansion, a first region of the LOE performs a first stage of aperture expansion and a second region of the LOE performs a second stage of aperture expansion. In certain embodiments in which the LOE performs two-dimensional aperture expansion, a light-absorbing material is deployed at the portion of the low index material that is attached to the first region of the LOE. As mentioned, in certain embodiments, more than one low index material is used to encapsulate the LOE. Such embodiments are particularly useful in combination with embodiments in which the LOE performs two-dimensional aperture expansion whereby a first low index material is attached to a first region of the LOE that performs a first stage of aperture expansion, and a second low index material is attached to a second region of the LOE that performs a second stage of aperture expansion. In certain embodiments, both the first and second low index materials are transparent materials, and a light-absorbing material is deployed at the first low index material. In other embodiments, the second low index material is a transparent material and the first low index material is a light-absorbing material having inherently low refractive index.

According to the teachings of an embodiment of the present invention, there is provided optical device for directing image illumination towards a user for viewing. The optical device comprises: a light-guide optical element (LOE) formed from a light-transmitting material having a first refractive index, the LOE including a plurality of surfaces including a pair of parallel major external surfaces for guiding image illumination within the LOE by total internal reflection at the major external surfaces, the LOE further including at least one optical coupling configuration for deflecting a proportion of the image illumination that is guided within the LOE by total internal reflection at the major external surfaces; and an optical material including at least one transparent material directly attached to the LOE at least at the major external surfaces so as to be in direct contact with the major external surfaces and so as to at least partially encapsulate the LOE, the optical material having a second refractive index that is less than the first refractive index so as to maintain conditions of total internal reflection at the major external surfaces, and the image illumination that is guided within the LOE by total internal reflection at the major external surfaces is incident to the major external surfaces at a range of angles greater than a critical angle defined by the first and second refractive indices, and the angles greater than the critical angle include shallow angles measured relative to the major external surfaces.

Optionally, the at least one transparent material is formed from a solid-state material.

Optionally, the at least one transparent material is formed from one or more layers of optical adhesive.

Optionally, the at least one transparent material is a thin coating layer of a polymer or dielectric material.

Optionally, the optical material has a thickness that is sufficiently small such that surface patterns of the optical material follow blemish patterns at the major external surfaces.

Optionally, the thickness is in a range from 2 μm to 20 μm.

Optionally, the first refractive index is in a range from 1.5 to 1.8.

Optionally, the second refractive index is in a range from 1.3 to 1.4.

Optionally, the at least one optical coupling configuration includes exactly one optical coupling configuration that deflects the proportion of the image illumination that is guided within the LOE by total internal reflection at the major external surfaces out of the LOE towards the user.

Optionally, the optical coupling configuration is implemented as a plurality of mutually parallel partially reflecting surfaces deployed within the LOE and oblique to the major external surfaces.

Optionally, the optical coupling configuration is implemented as at least one diffractive element associated with one of the major external surfaces.

Optionally, the LOE includes a first region and a second region, and the at least one optical coupling configuration includes a first optical coupling configuration located in the first region and a second optical coupling configuration located in the second region, the second optical coupling configuration configured for deflecting a part of the image illumination that is guided within the LOE by total internal reflection at the major external surfaces from the first region to the second region out of the LOE towards the user, and the first optical coupling configuration configured for deflecting a part of the image illumination that is guided within the first region by total internal reflection at the major external surfaces towards the second region.

Optionally, the first optical coupling configuration is implemented as a first plurality of mutually parallel partially reflecting surfaces having a first orientation, and the second optical coupling configuration is implemented as a second plurality of mutually parallel partially reflecting surfaces having a second orientation that is non-parallel to the first orientation.

Optionally, the first optical coupling configuration is implemented as a first at least one diffractive element associated with one of the major external surfaces, and the second optical coupling configuration is implemented as a second at least one diffractive element associated with one of the major external surfaces.

Optionally, the optical device further comprises: a light-absorbing material deployed in association with one or more portions of the at least one transparent material in the first region.

Optionally, the light-absorbing material has a refractive index that is equal to the first refractive index or no more than 10% greater than the first refractive index.

Optionally, the optical device further comprises: at least one optical element attached to the at least one transparent material.

Optionally, the at least one optical element includes: a lens attached to a first portion of the at least one transparent material that is directly attached to a first of the major external surfaces, and a protective film attached to a second portion of the at least one transparent material that is directly attached to a second of the major external surfaces.

Optionally, the at least one optical element includes: a first lens attached to a first portion of the at least one transparent material that is directly attached to a first of the major external surfaces, and a second lens attached to a second portion of the at least one transparent material that is directly attached to a second of the major external surfaces.

Optionally, the at least one optical element includes: a first protective film attached to a first portion of the at least one transparent material that is directly attached to a first of the major external surfaces, and a second protective film attached to a second portion of the at least one transparent material that is directly attached to a second of the major external surfaces.

Optionally, the LOE is a pre-cut LOE that is cut from a precursor LOE prior to the optical material being directly attached to the LOE such that the LOE includes substantially only an active area in which the image illumination propagates, and one or more perimeter edges of the LOE are coated with at least one layer of opaque material.

There is also provided according to an embodiment of the teachings of the present invention a method for fabricating an optical device that directs image illumination towards a user for viewing. The method comprises: obtaining a light-guide optical element (LOE) formed from a light-transmitting material having a first refractive index, the LOE including a plurality of surfaces including a pair of parallel major external surfaces for guiding image illumination within the LOE by total internal reflection at the major external surfaces, the LOE further including at least one optical coupling configuration for deflecting a proportion of the image illumination that is guided within the LOE by total internal reflection at the major external surfaces, and the image illumination that is guided within the LOE by total internal reflection at the major external surfaces is incident to the major external surfaces at a range of angles greater than a critical angle defined by the first and second refractive indices, and the angles greater than the critical angle include shallow angles measured relative to the major external surfaces; and directly attaching an optical material that includes at least one transparent material to the LOE at least at the major external surfaces such that the optical material directly contacts the major external surfaces and at least partially encapsulates the LOE, the optical material having a second refractive index that is less than the first refractive index so as to maintain conditions of total internal reflection at the major external surfaces.

Optionally, the LOE includes an active area in which the image illumination propagates and an inactive area in which the image illumination does not propagate or in which the image illumination is not directed towards the user, and the method further comprises: prior to directly attaching the optical material to the LOE: modifying the LOE to remove the inactive area such that substantially only the active area of the LOE remains, thereby producing a modified LOE, and coating one or more perimeter edges of the modified LOE with at least one layer of opaque material Optionally, the optical material is additionally directly attached to the opaque material at the one or more perimeter edges of the modified LOE.

Optionally, the method further comprises: cutting or trimming the optical material to achieve a contour of an eyepiece.

Optionally, the method further comprises: attaching at least one optical element to the at least one transparent material.

Optionally, the at least one optical element includes: a lens attached to a first portion of the at least one transparent material that is directly attached to a first of the major external surfaces, and a protective film attached to a second portion of the at least one transparent material that is directly attached to a second of the major external surfaces.

Optionally, the at least one optical element includes: a first lens attached to a first portion of the at least one transparent material that is directly attached to a first of the major external surfaces, and a second lens attached to a second portion of the at least one transparent material that is directly attached to a second of the major external surfaces.

Optionally, the at least one optical element includes: a first protective film attached to a first portion of the at least one transparent material that is directly attached to a first of the major external surfaces, and a second protective film attached to a second portion of the at least one transparent material that is directly attached to a second of the major external surfaces.

Optionally, the LOE includes a first region and a second region, and the at least one optical coupling configuration includes a first optical coupling configuration located in the first region and a second optical coupling configuration located in the second region, the second optical coupling configuration configured for deflecting a part of the image illumination that is guided within the LOE by total internal reflection at the major external surfaces from the first region to the second region out of the LOE towards the user, and the first optical coupling configuration configured for deflecting a part of the image illumination that is guided within the first region by total internal reflection at the major external surfaces towards the second region, and the method further comprises: deploying a light-absorbing material in association with one or more portions of the at least one transparent material in the first region.

Optionally, the light-absorbing material has a refractive index that is equal to the first refractive index or no more than 10% greater than the first refractive index.

Optionally, directly attaching the at least one transparent material to the LOE includes performing a process selected from the group consisting of: dip-coating, spin coating, bonding, and molding.

There is also provided according to an embodiment of the teachings of the present invention an optical device for directing image illumination towards a user for viewing. The optical device comprises: a light-guide optical element (LOE) formed from a light-transmitting material having a first refractive index, the LOE including: a plurality of surfaces including at least one pair of parallel major external surfaces for guiding image illumination within the LOE by total internal reflection at the major external surfaces, a first region and a second region, and a first optical coupling configuration located in the first region and a second optical coupling configuration located in the second region, the second optical coupling configuration configured for deflecting a part of the image illumination that is guided within the LOE by total internal reflection at the major external surfaces from the first region to the second region out of the LOE towards the user, and the first optical coupling configuration configured for deflecting a part of the image illumination that is guided within the first region by total internal reflection at the major external surfaces towards the second region; a transparent material directly attached to the LOE at least at the major external surfaces so as to be in direct contact with the major external surfaces and so as to at least partially encapsulate the LOE, the transparent material having a second refractive index that is less than the first refractive index so as to maintain conditions of total internal reflection at the major external surfaces; and a light-absorbing material deployed in association with one or more portions of the transparent material in the first region.

There is also provided according to an embodiment of the teachings of the present invention an optical device for directing image illumination towards a user for viewing. The optical device comprises: a light-guide optical element (LOE) formed from a light-transmitting material having a first refractive index, the LOE including: a plurality of surfaces including at least one pair of parallel major external surfaces for guiding image illumination within the LOE by total internal reflection at the major external surfaces, a first region and a second region, and a first optical coupling configuration located in the first region and a second optical coupling configuration located in the second region, the second optical coupling configuration configured for deflecting a part of the image illumination that is guided within the LOE by total internal reflection at the major external surfaces from the first region to the second region out of the LOE towards the user, and the first optical coupling configuration configured for deflecting a part of the image illumination that is guided within the first region by total internal reflection at the major external surfaces towards the second region; a light-absorbing material directly attached to the LOE at the major external surfaces in the first region so as to be in direct contact with the major external surfaces in the first region; and a transparent material directly attached to the LOE at the major external surfaces in the second region so as to be in direct contact with the major external surfaces in the second region, the transparent material and the light-absorbing material cooperating to at least partially encapsulate the LOE, and each of the transparent material and the light-absorbing material having a refractive index that is less than the first refractive index so as to maintain conditions of total internal reflection at the major external surfaces.

There is also provided according to an embodiment of the teachings of the present invention an optical device for directing image illumination towards a user for viewing. The optical device comprises: a light-guide optical element (LOE) formed from a light-transmitting material having a first refractive index, the LOE including: a plurality of surfaces including at least one pair of parallel major external surfaces for guiding image illumination within the LOE by total internal reflection at the major external surfaces, a first region and a second region, and a first optical coupling configuration located in the first region and a second optical coupling configuration located in the second region, the second optical coupling configuration configured for deflecting a part of the image illumination that is guided within the LOE by total internal reflection at the major external surfaces from the first region to the second region out of the LOE towards the user, and the first optical coupling configuration configured for deflecting a part of the image illumination that is guided within the first region by total internal reflection at the major external surfaces towards the second region; at least one transparent material directly attached to the LOE at least at the major external surfaces so as to be in direct contact with the major external surfaces and so as to at least partially encapsulate the LOE, the at least one transparent material having a second refractive index that is less than the first refractive index so as to maintain conditions of total internal reflection at the major external surfaces; at least one protective film associated at least with a portion of the at least one transparent material such that the at least one protective film is associated with a portion of at least one of the major external surfaces in the first region; and a coating deployed on at least a portion of the at least one protective film such that the coating is associated with the portion of the at least one transparent material.

Optionally, in any one of the optical devices according to embodiments of the present invention the first region is configured as a first LOE section having two pairs of parallel major external surfaces forming a rectangular cross-section such that the image illumination propagates through the first LOE section by total internal reflection at the two pairs of parallel major external surfaces.

Within the context of this document, the term "guided" generally refers to light that is trapped within a light-transmitting material (e.g., a substrate) by total internal reflection at major external surfaces of the light-transmitting material such that the light that is trapped within the light-transmitting material propagates in a propagation direction through the light-transmitting material.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
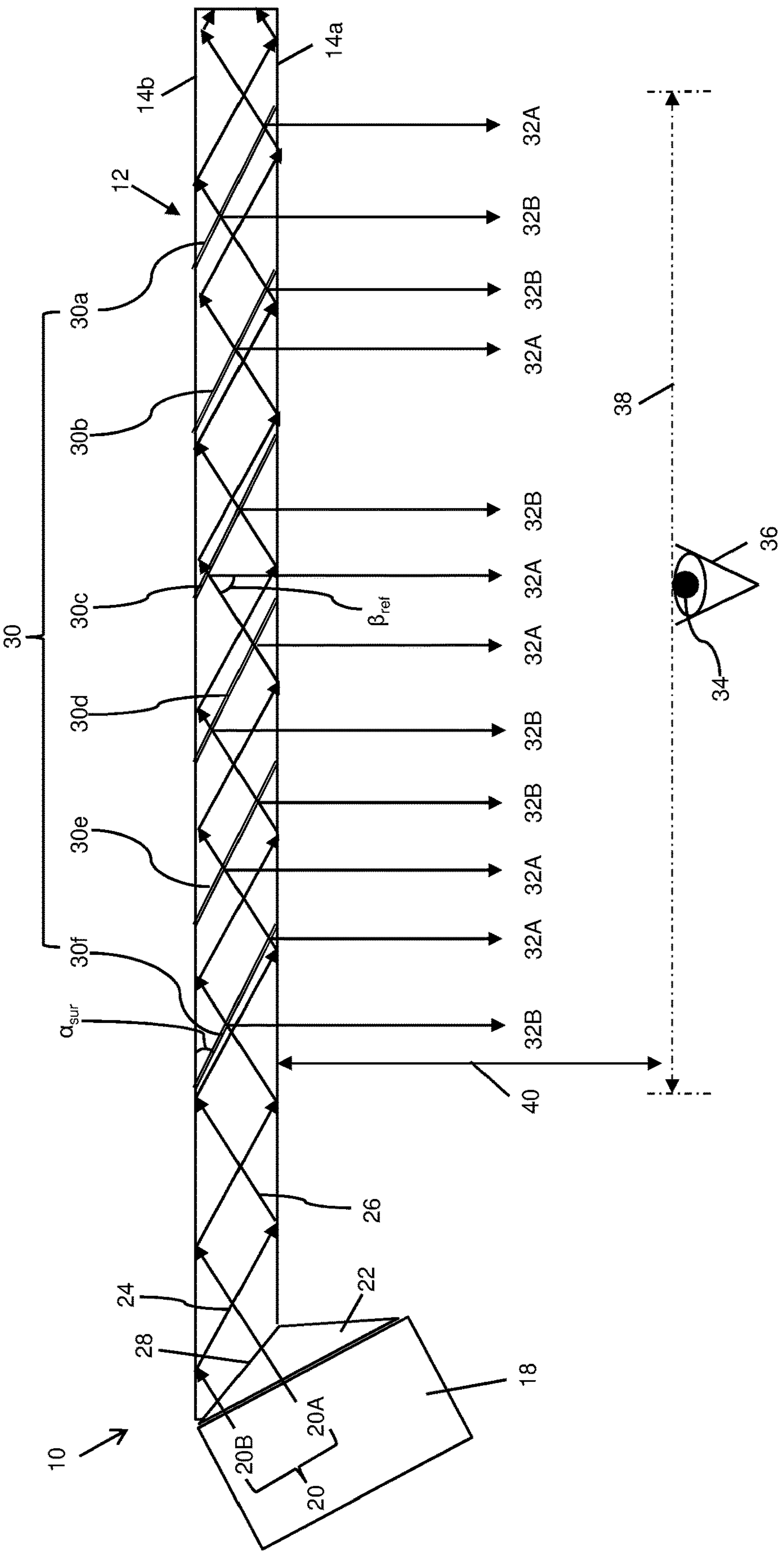
FIG. 1 is a schematic side view of an optical device having a light-guide optical element (LOE), having a pair of parallel faces and partially-reflecting surfaces oblique to the parallel faces, that can be used with embodiments of the present invention.

Embodiments of the present invention provide encapsulated light-guide optical elements (LOEs), optical devices having encapsulated LOEs, methods of fabricating optical devices having encapsulated LOEs, and methods of encapsulating LOEs. The encapsulated LOEs according to the embodiments of the present invention are particularly suitable for use as part of a near eye display or head up display for augmented reality applications.

The principles and operation of the LOEs, optical devices and methods according to embodiments of the present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions, such as, for example, front and back, and the like. These directional references are exemplary only, and are used only for ease of presentation and refer to the arbitrary orientations as illustrated in the drawings. The LOEs and optical devices may be deployed in any required orientation.

By way of introduction, FIG. 1 schematically illustrates a light-guide optical element (LOE) 12 that can be used with embodiments of the present invention. Initially, it is noted that the LOE 12 in FIG. 1 is part of an optical device 10 that can include other optical components besides the LOE 12, most notably an image projector 18 and an optical coupling-in configuration 22. Such components may also be present in optical devices constructed and operative according to embodiments of the present invention.

The LOE 12 is formed as a parallel-faced slab (also referred to as a substrate) of transparent (i.e., light-transmitting) material within which image illumination propagates (i.e., is guided) by total internal reflection at external surfaces of the slab. In this particular embodiment, the LOE 12 has a plurality of surfaces including a pair of planar parallel major external surfaces (faces) 14*a*, 14*b* for guiding the image illumination (light) by total internal reflection.

The image projector 18 generates an image 20, as represented here schematically by a beam of illumination 20 including sample rays 20A and 20B which span the beam. The image 20 is coupled into the LOE 12 by the optical coupling-in configuration 22, as illustrated here schematically by a coupling prism 22 (although any suitable coupling-in arrangement, including coupling reflectors and diffractive gratings, can be used), so as to generate reflected rays 24 which are trapped by total internal reflection within the LOE 12, generating also rays 26. Here, the coupling prism 22 includes three major surfaces, one of which is located next to (or is common with) a slant edge 28 of the LOE 12 (where the edge 28 is at an oblique angle to the major external surfaces 14*a*, 14*b*).

The coupled-in image 20 propagates along the LOE 12 by repeated total internal reflection from the major external surfaces 14*a*, 14*b*, impinging on an optical coupling-out configuration 30, as illustrated here schematically by a sequence of mutually parallel partially reflecting internal surfaces 30*a*, 30*b*, 30*c*, 30*d*, 30*e*, 30*f* (collectively designated 30) at an oblique angle ($\alpha_{sur}$) to the major external surfaces 14*a*, 14*b*, where part of the image intensity is reflected so as to be deflected (coupled out) of the substrate as rays 32A and 32B toward the pupil 34 of an eye 36 (of an observer/user) that is located in eye motion box (EMB) 38 at a an eye relief (ER) distance 40 from the major external surface 14*a*. The transparency of the LOE 12 enables the observer to view the coupled-out image 20 overlaid on the view of the external scene (i.e., real-world scene) at the front side of the LOE 12 (i.e., at the face 14*b*), which is of particular use when the optical device 10 is deployed as part of an augmented reality (AR) system.

In order to minimize unwanted reflections of the image 20 which might give rise to ghost images, the partially reflecting internal surfaces (also referred to herein as "facets") 30 are preferably coated with reflective coating so as to have low reflectance for a first range of incident angles, while having the desired partial reflectivity for a second range of incident angles, where a ray with a small inclination to the normal to a partially reflecting surface 30 (represented here as angle $\beta_{ref}$) is split in order to generate a reflected ray for coupling out, while a high inclination (to the normal) ray is transmitted with negligible reflection.

The image 20 is a collimated image, i.e., where each pixel is represented by a beam of parallel rays at a corresponding angle, equivalent to light from a scene far from the observer (the collimated image is referred to as being "collimated to infinity"). The image is represented here simplistically by rays corresponding to a single point in the image, typically a centroid of the image, but in fact includes a range of angles to each side of this central beam, which are coupled into the substrate with a corresponding range of angles, and similarly coupled out at corresponding angles, thereby creating a field of view (FOV) corresponding to parts of the image arriving in different directions to the eye 36 of the observer.

Although the image projector 18 is schematically illustrated here as a rectangle, the image projector 18 includes at least one light source, typically deployed to illuminate a spatial light modulator, such as an LCOS chip. The spatial light modulator modulates the projected intensity of each pixel of the image, thereby generating an image. Alternatively, the image projector may include a scanning arrangement, typically implemented using a fast-scanning mirror, which scans illumination from a laser light source across an image plane of the projector while the intensity of the beam is varied synchronously with the scanning motion on a pixel-by-pixel basis, thereby projecting a desired intensity for each pixel. In both cases, collimating optics are provided to generate an output projected image which is collimated to infinity. Some or all of the above components are typically arranged on surfaces of one or more polarizing beam splitter (PBS) cube or other prism arrangement, as is well known in the art The performance of the LOE 12 is strongly dependent on the total internal reflection (TIR) of the image illumination across the entire desired field. As is known in the art, the principles of TIR are governed by critical angle, which is determined by the refractive index of the material from which the LOE 12 is constructed (typically glass, for example BK7 which has a refractive index of approximately 1.52) and the refractive index of the surrounding medium contacting the LOE 12. Specifically, the critical angle for light propagation through the LOE is defined as $$\theta_c = \sin^{-1}\frac{\eta_m}{\eta_L},$$

where $\eta_m$ is the refractive index of the medium surrounding the LOE, and $\eta_L$ is the refractive index of the LOE. For example, if the LOE is constructed from BK7 and the medium immediately contacting the major external surfaces 14*a*, 14*b* is air (which has a refractive index that is practically unity, i.e., a refractive index of 1), then $$\theta_c = \sin^{-1}\frac{1}{1.52} \approx 41.1^\circ.$$

Thus, the performance of the LOE 12 is generally determined by the angles of the propagating light field within the LOE 12, and the refractive indices of the LOE 12 and the surrounding medium.

In conventional optical devices that utilize LOEs to perform aperture multiplication (i.e., aperture expansion), such as the optical device 10 of FIG. 1, the surrounding medium that contacts the major surfaces 14*a*, 14*b* of the LOE is typically air. This can present problems in several respects. In one respect, directly contacting the major surfaces 14*a*, 14*b* of the LOE with air can leave the LOE exposed to the environment thus leaving the LOE unprotected from damage and reducing the overall mechanical stability of the optical device. This also reduces the mechanical contact area of the LOE to other functional or mechanical elements, such a mechanical body that supports the LOE, in particular eyeglass frames in which the LOE can be mounted in certain near-eye display implementations. In another respect, deployment of additional optical elements, such as lenses or optical films, to the major external surfaces 14*a*, 14*b* while maintaining a small form factor and good optical performance can be particularly difficult. For example, direct bonding of additional optical elements to the major LOE surfaces can negatively impact TIR due to the refractive index of the bonding material (e.g., optical cement), which is less than the refractive index of the LOE but is typically higher than that of air and therefore increases critical angle thereby reducing the effective FOV. Conditions of TIR with lower critical angle can be maintained with an air gap between the additional optical element and the LOE 12, however such air gaps increase the thickness of the optical device resulting in a bulkier device, and also reduce the mechanical stability of the device.

In order to overcome these limitations, embodiments of the present invention provide an LOE that is formed from a material having a moderate to moderately high refractive index, and that is at least partially encapsulated in an encapsulation structure formed from optical material, that includes at least one transparent material, having a lower refractive index than the LOE but still greater than unity.

Figures 2A, 2B, 2C:
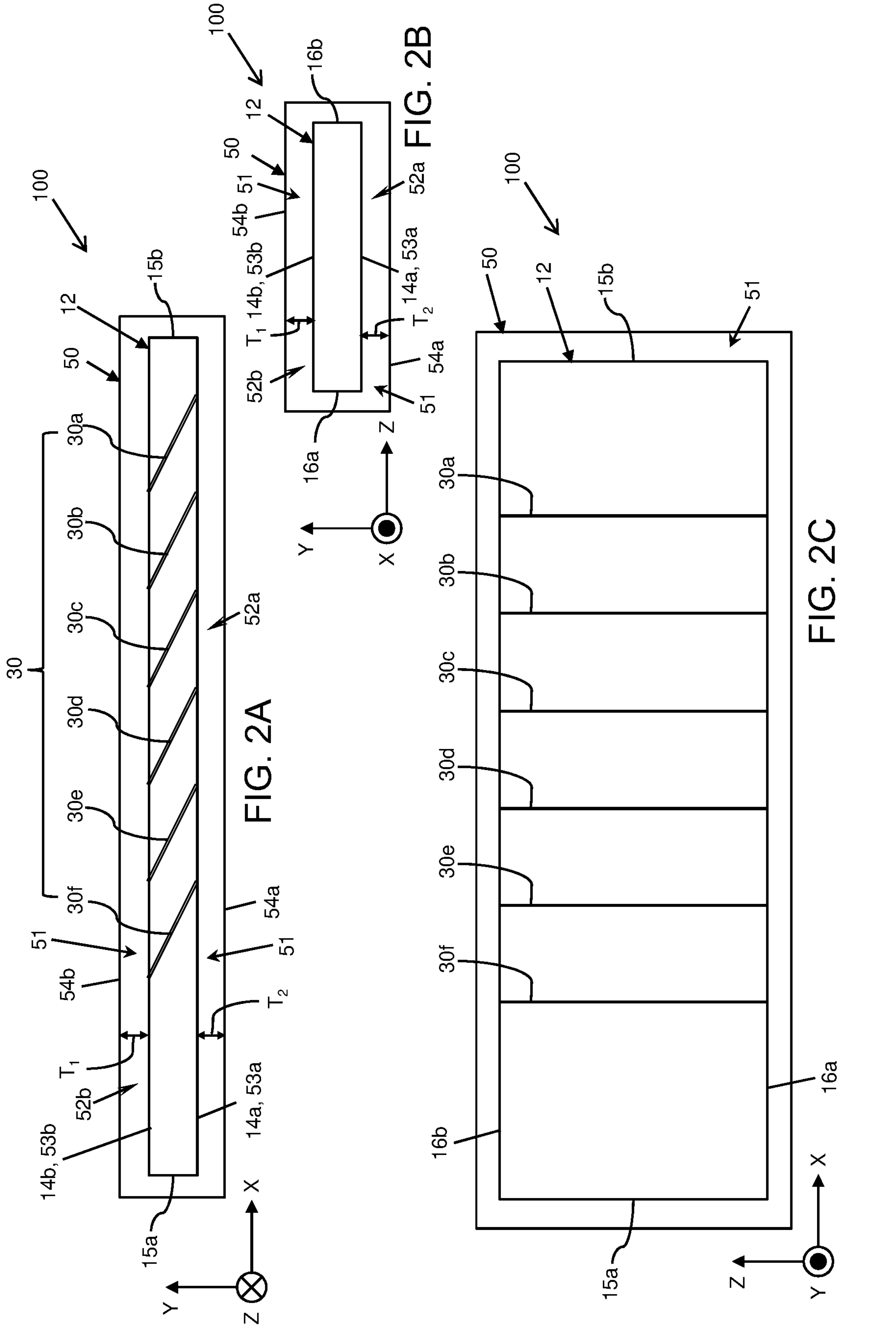
FIGS. 2A-2C are schematic side, plan, and front views, respectively, of an optical device having an LOE similar to the LOE of FIG. 1, encapsulated by a capsule formed from a transparent material having a refractive index lower than the refractive index of the LOE, according to embodiments of the present invention.

Turning now to FIGS. 2A-2C, there is schematically illustrated an optical device, generally designated 100, constructed and operative according to an embodiment of the present invention. Here, the optical device 100 includes LOE 12, and also includes an encapsulation structure 50 that is formed from optical material 51 that encapsulates the LOE 12. The optical device 100 can be shaped to approximately form of an eyepiece, that is an eyepiece that is part of a near-eye display, for example as part of an eyeglasses form factor. It is noted that the LOE illustrated in FIGS. 2A-2C is similar in structure to the LOE illustration FIG. 1 with the notable exceptions that the LOE illustrated in FIGS. 2A-2C is not shown with a slant edge, and no optical coupling-in configuration is shown in FIGS. 2A-2C. This is for clarity of presentation only, as encapsulated LOEs according to embodiments of the present disclosure may include one or more slant edges (i.e., edges or surfaces that are oblique to the parallel surfaces 14*a*, 14*b*), and optical coupling-in configurations used with encapsulated LOEs will be discussed in subsequent sections of the present disclosure.

Also illustrated in FIGS. 2A-2C are two additional sets of external surfaces 15*a*, 15*b* and 16*a*, 16*b* of the LOE 12. These surfaces 15*a*, 15*b*, 16*a*, 16*b* are also referred to as perimeter surfaces/edges or peripheral surfaces/edges 15*a*, 15*b*, 16*a*, 16*b*. Each of the pairs of surfaces 15*a*, 15*b* and 16*a*, 16*b* can, in certain embodiments, be a pair of parallel surfaces. In certain embodiments, both pairs of surfaces 14*a*, 14*b* and 15*a*, 15*b* is a pair of parallel surfaces and the three pairs of surfaces 14*a*, 14*b*, 15*a*, 15*b*, 16*a*, 16*b* are mutually perpendicular.

The encapsulation structure 50 (also referred to herein interchangeably as a "capsule") and the LOE 12 are arranged such that the optical material 51 of the capsule 50 is directly attached to the LOE 12 at least at the major external surfaces 14*a*, 14*b* so as to be in direct contact (i.e., at a direct abutment) with the major external surfaces 14*a*, 14*b*, thereby encapsulating the LOE 12. By direct contact, it is meant that no intermediate layer(s) of material(s) is/are present between the optical material 51 of the capsule 50 and the major external surfaces 14*a*, 14*b* of the LOE 12. Such intermediate materials include solid materials, semi-solid materials, as well as air. Therefore, it should be made clear that a key distinction of the encapsulated LOEs according to embodiments of the present invention is that no air gap is present between the optical material 51 of the capsule 50 and the major external surfaces 14*a*, 14*b* of the LOE 12.

In certain embodiments of the present invention, the LOE 12 is formed from a light-transmitting material having a moderate to moderately high refractive index, preferably a refractive index that falls in a range from 1.5 to 1.8 (i.e., $1.5 \leq \eta_L \leq 1.8$). The encapsulation structure 50 is formed from an optical material 51 having a refractive index that is less than the refractive index of the LOE but is still greater than the refractive index of air (i.e., greater than unity). In preferred embodiments, the encapsulation structure 50 is formed from an optical material 51 having a refractive index that falls in a range from 1.1 to 1.4 (i.e., $1.1 \leq \eta_m \leq 1.4$), more preferably in a range from 1.2 to 1.4 (i.e., $1.2 \leq \eta_m \leq 1.4$), and most preferably in a range from 1.3 to 1.4 (i.e., $1.3 \leq \eta_m \leq 1.4$).

In one non-limiting embodiment, the encapsulation structure 50 is formed from a transparent material in the form of an optical adhesive having a refractive index of approximately 1.34 (i.e., $\eta_L$=1.34), for example an optical adhesive available from Norland Products, Inc. of Jamesburg, NJ, USA. A detailed discussion of the types of transparent materials from which the capsule 50 can be formed is provided in subsequent sections of the present disclosure.

The optical material from which the encapsulation structure 50 is formed is referred to interchangeably herein as a low index material 51. Within the context of the present document, the term "low" in the expression "low index" is taken relative to the refractive index of the LOE 12. In other words, the optical material 51 has a low refractive index in comparison to the refractive index of the LOE 12, i.e., the optical material has a lower refractive index than the refractive index of the LOE 12 (preferably the optical material has a refractive index that is at least approximately 7% lower than the refractive index of the LOE).

In the disclosed embodiments, the optical material 51 includes at least one transparent material. As will be discussed, in certain embodiments, a single transparent material is used to encapsulate the LOE. In other embodiments, two transparent materials (arranged adjacent to each other) are used to encapsulate the LOE. In yet other embodiments, a transparent material and a light-absorbing material are used to encapsulate the LOE. All such transparent materials and light-absorbing materials used for encapsulation according to the embodiments of the present invention are low index materials in accordance with the definition of low index material defined above.

By constructing the LOE 12 from a moderate to moderately high refractive index material and providing a capsule 50 formed from a low index material 51, conditions of TIR can be maintained with a usable critical angle when the LOE 12 is encapsulated in the capsule 50. For example, using the extreme values of the refractive index ranges above as a basis, a critical angle in a range from approximately 37.7° (when $\eta_m$=1.1 and $\eta_L$=1.8) to 69° (when $\eta_m$=1.4 and $\eta_L$=1.5) can be achieved.

In certain embodiments, it may be desirable to inject image illumination into the LOE 12 such that the injected illumination propagates by TIR and is incident to the major surfaces 14*a*, 14*b* at a range of angles that are greater than the critical angle, including shallow angles which are measured relative to the planes of the major external surfaces 14*a*, 14*b*. These shallow angles correspond to high angle of incidence (AOI), preferably AOIs in a range between 60° to 80°. The propagation of image illumination within the LOE by TIR at angles greater than the critical angle that include shallow angles has an advantageous effect of including a larger portion of the light field of the image. This may be of particular value in situations in which the critical angle is larger than a preferred angle (e.g., larger than 50°) which results in a larger portion of the light field being below the critical angle and thus not being trapped in the LOE 12. Injecting the image illumination into the LOE such that the image illumination is trapped within the LOE by TIR at the major surface 14*a*, 14*b* and such that the propagating image illumination is incident to the major surfaces 14*a*, 14*b* at a range of angles that are greater than the critical angle that include shallow angles can be accomplished by appropriately designing the optical coupling-in configuration, for example by appropriately designing the angle of a coupling-in prism or coupling-in reflector.

It is noted that in FIGS. 2A-2C, the LOE 12 is shown as being encapsulated by the capsule 50 such that in addition to being in direct contact with the of the surfaces 14*a*, 14*b*, the low index material 51 is also in direct contact with the entirety of the surfaces 15*a*, 15*b* (as seen in FIGS. 2A and 2C) as well as the entirety of the surfaces 16*a*, 16*b* (as seen in FIGS. 2B and 2C). Despite FIGS. 2A-2C showing direct contact of the low index material with the surfaces 15*a*, 15*b*, 16*a*, 16*b*, this contact is only optional, and encapsulation at the major external surfaces 14*a*, 14*b* is the preferred minimum amount of encapsulation as this encapsulation provides the necessary working conditions for TIR. In fact, in certain non-limiting implementations it may be more practical to encapsulate the LOE such that the low index material is only attached at the major surfaces of the LOE.

In certain preferred embodiments, the encapsulation at the major external surfaces 14*a*, 14*b* is a full encapsulation whereby a layer of the low index material 51 extends across the entirety of the length of each the major external surfaces 14*a*, 14*b*. However, in other preferred embodiments the low index material may (in certain cases) partially extend across the length of the major external surfaces 14*a*, 14*b* thereby possibly leaving end portions (just before the surfaces 15*a*, 15*b*) of the LOE 12 uncontacted by the low index material. Preferably, the partial extension covers the portions of the major external surfaces 14*a*, 14*b* through which the image illumination propagates and ultimately reaches the eye of the observer. Preferably, this partial extension is across the vast majority (or bulk) of the length of the major external surfaces 14*a*, 14*b* (where vast majority of the length refers to preferably at least 80% of the length, and more preferably at least 90% of the length, and even more preferably at least 95% of the length). In these "partial extension" embodiments, the LOE is considered to be "partially encapsulated".

In the arbitrarily labeled xyz coordinate system used in the drawings, the "length" is measured along the x-dimension. It is also noted that the low index material 51 preferably extends across the entirety of the major external surfaces 14*a*, 14*b* in the transverse direction (perpendicular to the length), which in the arbitrarily labeled xyz coordinate system used in the drawings is measured along the z-dimension. In other words, the low index material preferably extends just up to the edges 16*a*, 16*b*.

As stated above, in certain non-limiting embodiments the low index material extends just up to the edges 15*a*, 15*b* in the length dimension (x-dimension in the drawings). However, in certain cases the low index material may extend beyond the edges 15*a*, 15*b* in the length dimension (x-dimension in the drawings) such that portions of the low index material are in direct contact with the edges 15*a*, 15*b*. In certain cases the low index material may also extend beyond the edges 16*a*, 16*b* in the transverse dimension (z-dimension in the drawings) such that portions of the low index material are in direct contact with the edges 16*a*, 16*b*.

The layer (or layers) of the low index material 51 of the capsule 50 that extends across the length of the surface 14*a* corresponds to a first region 52*a* of the capsule 50 that is directly attached to the surface 14*a*. Similarly, the layer (or layers) of the low index material 51 of the capsule 50 that extends across the length of the surface 14*b* corresponds to a second region 52*b* of the capsule 50 that is directly attached to the surface 14*b*. The low index material 51 has interior/internal contact portions that directly contact the LOE at the major external surfaces 14*a*, 14*b*. These interior/internal contact portions are also referred to as "interfacing" portions. A first of the contact portions 53*a* is in the first region 52*a* of the low index material 51, and directly contacts the LOE 12 at the surface 14*a* so as to form an interface between the low index material 51 and the surface

14*a* of the LOE 12. Similarly, a second of the contact portions 53*b* of the interfacing portion is in the first region 52*a* of the low index material 51, and directly contacts the LOE 12 at the surface 14*b* so as to form an interface between the low index material 51 and the surface 14*b* of the LOE 12. The image illumination that is injected into the LOE 12 is thus guided (i.e., propagates) by TIR at the major external surfaces 14*a*, 14*b*, and by equivalence is guided by TIR at the interfaces between the low index material 51 and the surfaces 14*a*, 14*b*.

Each of the regions 52*a*, 52*b* of the low index material 51 has an associated thickness. Specifically, the region 52*a* has an associated thickness $T_1$ that is measured between the surface 14*a* (and equivalently the contact portion 53*a* of the interfacing portion) and an external surface 54*a* of the low index material 51 of the capsule 50. Similarly, the region 52*b* has an associated thickness $T_2$ that is measured between the surface 14*b* (and equivalently the contact portion 53*b* of the interfacing portion) and the external surface 54*b* of the low index material 51 of the capsule 50.

Similar principles apply in cases where there is direct contact of the low index material at one or more of the other surfaces 15*a*, 15*b*, 16*a*, 16*b* of the LOE 12. For example, the low index material may have additional interfacing portions that directly contact the remaining surfaces 15*a*, 15*b*, 16*a*, 16*b* of the LOE 12. These additional interfacing portions are in regions of the capsule 50, parts of which may overlap with the regions 52*a*, 52*b*.

It is noted that although the external surfaces of the capsule 50 (e.g., surface 54*a*, surface 54*b*, and other external surfaces which are not labeled in the drawings) are shown as planar surfaces, one or more (and in some cases all) of the external surfaces of the capsule can be curved or otherwise non-planar surfaces.

Parenthetically, the dimensions of the LOE 12 and the capsule 50, including the thicknesses of the two regions 52*a*, 52*b*, are exaggerated for clarity in the drawings in order to better explain the principles of the present invention. Generally speaking, the thickness of the low index material 51 at the regions 52*a*, 52*b* can be as small as 2 μm and can be as large as permitted by optical design and manufacturing constraints. However, in certain embodiments the thickness of the low index material 51 preferably does not exceed 100 μm, i.e., the thickness of the low index material 51 is preferably in a range between 2 μm to 100 μm. In fact, it may be particularly advantageous to keep the thickness of the two regions 52*a*, 52*b* relatively small, more preferably in a range between 2 μm to 20 μm, and even more preferably in a range between 2 μm to 10 μm, which can increase optical performance while at the same time reduce the overall bulk of the optical device. Preferably, the thickness of the low index material 51 at the surfaces 14*a*, 14*b* is sufficiently small such that surface patterns of the low index material 51 follow blemish patterns at the surfaces 14*a*, 14*b*. These blemish patterns are typically micron-level imperfections at the surfaces 14*a*, 14*b*, for example in the form minor indentations along various portions of the surfaces 14*a*, 14*b*, and may emerge during the manufacturing process of the LOE 12, for example during polishing stages. The blemish patterns may result in a proportion of intensity of the image illumination that is TIR-guided through the LOE 12 escaping out of the LOE 12. If the low index material 51 is too thick, image illumination that escapes the LOE 12 may be reflected by the low index material back into the LOE 12 at unwanted angles, potentially resulting in ghost images and reducing optical performance. By making the low index material thin enough, more preferably in a range between 2 μm to 20 μm, and even more preferably in a range between 2 μm to 10 μm, surface patterns of the low index material will follow the blemish patterns of the LOE surfaces 14*a*, 14*b*, such that TIR-guided illumination that escapes the LOE 12 through the surfaces 14*a*, 14*b* most often also escape out of the low index material so as not to be reintroduced back into the LOE 12.

It is noted that the above-mentioned thickness ranges of the low index material 51 can also be expressed as a percent of the LOE thickness (measured in the y-dimension between the surfaces 14*a*, 14*b*). In preferred embodiments, the thickness of the LOE 12 is typically in a range of 0.6 mm to 1.5 mm (600 μm to 1500 μm). Thus, the low index material 51 thickness ranges of greater than 2 μm, preferably between 2 μm to 100 μm, more preferably between 2 μm to 20 μm, and even more preferably between 2 μm to 10 μm respectively correspond to: greater than 0.13% of the thickness of the LOE, preferably between 0.13% to 16.67% of the thickness of the LOE, more preferably between 0.13% to 3.33% of the thickness of the LOE, and even more preferably between 0.13% to 1.67% of the thickness of the LOE.

Generally speaking, the capsule 50 can be formed from various types of transparent low index materials. Such transparent materials include, but are not limited to, bulk materials (such as glass or polymers), optical adhesives, dielectric materials, polymer materials (such polymer resin), and the like. All of these materials can be directly attached (i.e., directly bonded) to the LOE 12 at the surfaces 14*a*, 14*b* using various known techniques which facilitate direct attachment without use of any intermediate materials or layers between the low index material 51 and the surfaces 14*a*, 14*b*.

In certain embodiments, one or more layers of the low index material 51 can be directly attached to the surfaces 14*a*, 14*b*. This may be particularly applicable in embodiments in which the low index material is implemented as a low index optical adhesive, which can also easily accommodate attachment of additional optical components or elements to the LOE.

In other embodiments, it may be preferable to provide a single thin layer of the low index material. This may be particularly applicable in embodiments in which the low index material is implemented as a low index dielectric material or a low index polymer.

In yet further embodiments, two or more low index materials can be deployed at different regions of the LOE so as to cooperate to encapsulate the LOE. Such embodiments are of particular advantage in situations in which the LOE provides aperture expansion two dimensions, as will be discussed in subsequent sections of the present disclosure.

The technique used to attach/bond the low index material 51 to the surfaces 14*a*, 14*b* may depend on the type of low index material used. For example, if a bulk material is used, sonication or a heat treatment bonding process can be used to directly attach the bulk material to the surfaces 14*a*, 14*b*. In this respect, within the context of the present disclosure, bulk material refers to any solid-state material, including, for example, glass or polymer, that can be attached directly to the surfaces 14*a*, 14*b* of the LOE 12 using any process (e.g., sonication, heat treatment, and the like) that induces direct bonding without any intermediate materials present between the solid-state material and the LOE 12.

It is noted that the major surfaces 14*a*, 14*b* of the LOE 12, as well as the surfaces 54*a*, 54*b* of the capsule 50, are preferably polished so as to improve optical quality. The polishing can be performed using any polishing tool or apparatus known in the art.

The process by which the LOE 12 is encapsulated by the capsule 50 is referred to herein as an encapsulation process. The encapsulation process can be performed using various techniques that are known in the art, including, but not limited to, dip-coating, spin coating, bonding, and molding. Dip-coating and spin coating are both industrial coating processes that are well-known in the art of substrate fabrication and processing. Bonding techniques have been discussed above, and are particularly suitable when the low index material 51 is a solid-state (bulk material). Molding techniques, such as injection molding, may be particularly useful in embodiments in which the low index material 51 is implemented as a polymer or polymer resin. In such embodiments, the LOE 12 can be inserted into a mold that defines the shape of the capsule, and the low index material, such polymer resin, can then be provided (e.g., injected) into the mold and then left to cure until set and then the encapsulated LOE can be removed from the mold.

In certain scenarios, image illumination propagating through the LOE 12, or illumination from an external scene, may impinge on portions of the LOE, such as one or more of the other surfaces 15*a*, 15*b*, 16*a*, 16*b* of the LOE 12, which may cause scattering of part of the illumination. This scattered illumination may, in some cases, reach the user's eye, for example via deflection by the optical coupling-out configuration 30. In order to mitigate and preferably altogether prevent light scattering effects, certain embodiments of the present invention provide a layer (or layers) of an opaque material, such as light-absorbing paint (e.g., black paint), at the perimeter edges 15*a*, 15*b*, 16*a*, 16*b* of the LOE 12. As a result, when illumination impinges on the perimeter edges 15*a*, 15*b*, 16*a*, 16*b* that would otherwise scatter, the illumination is preferably absorbed by the opaque material.

Figure 3:
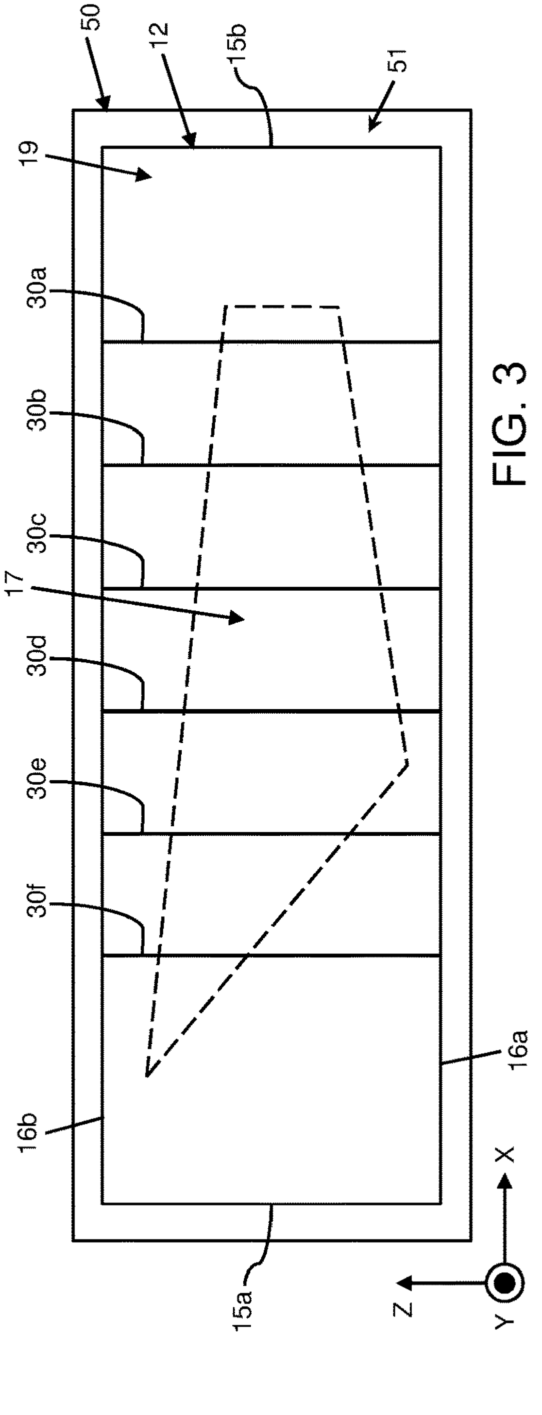
FIG. 3 is a schematic front view similar to FIG. 2C, but showing active and inactive areas of the LOE.

In certain embodiments, the opaque material coating process can be simplified by reducing the surface area of the perimeter edges 15*a*, 15*b*, 16*a*, 16*b* that is to be coated with the opaque material. Before discussing this simplification in detail, it is first noted that the LOE 12 can typically be sub-divided into an active area in which the image illumination propagates and is eventually directed toward the user, and an inactive area in which the image illumination does not propagate or in which the image illumination is not directed towards the user. The active area and the inactive area are referred to interchangeably as an "imaging area" and "non-imaging area" respectively. The imaging area can be defined by an envelope that is mapped out by all ray paths propagating within the LOE 12 deflected by the optical coupling-out configuration 30 toward the EMB. FIG. 3 illustrates a schematic front view of the LOE 12 similar to as shown in FIG. 2C, except here the LOE 12 is shown with an active area 17 (demarcated by dashed lines) and an inactive area 19.

Figure 4A:
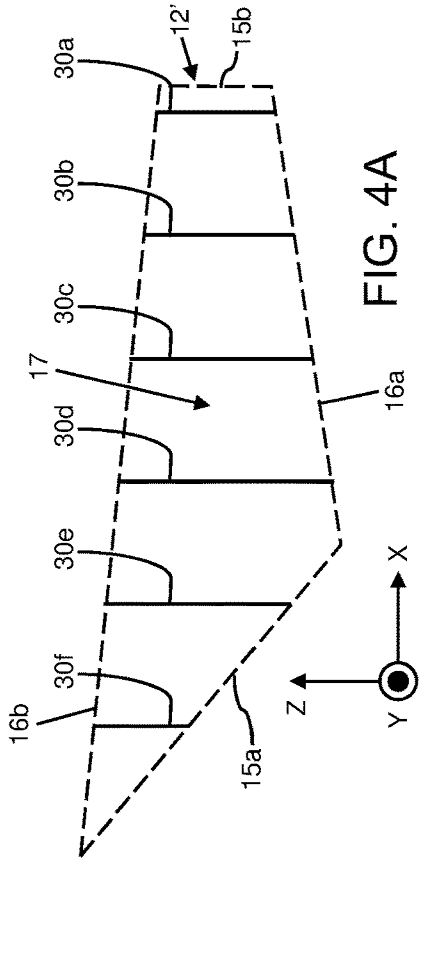
FIG. 4A is a schematic front view of an LOE that has been trimmed or cut to remove the inactive area, according to embodiments of the present invention.

In certain embodiments, surface area of the perimeter edges 15*a*, 15*b*, 16*a*, 16*b* can be reduced by cutting or trimming the LOE 12 to remove substantially the entirety (i.e., all or most) of the inactive area 19, thereby providing an LOE that contains effectively only an active area. Such an LOE 12' is illustrated in FIG. 4A. In certain embodiments, the LOE 12' is a pre-cut LOE that is cut or trimmed from LOE 12 (here, LOE 12 is referred to also as a precursor LOE). The LOE 12 is thus modified (via cutting/trimming) to remove the inactive area 19, thereby producing modified LOE 12' having only active area 17. The modified LOE 12' can then be polished at the surfaces 14*a*, 14*b* to improve optical quality. Alternatively, the surfaces 14*a*, 14*b* of the precursor LOE 12 can be polished prior to cutting/trimming to remove the inactive area 17.

Figure 4B:
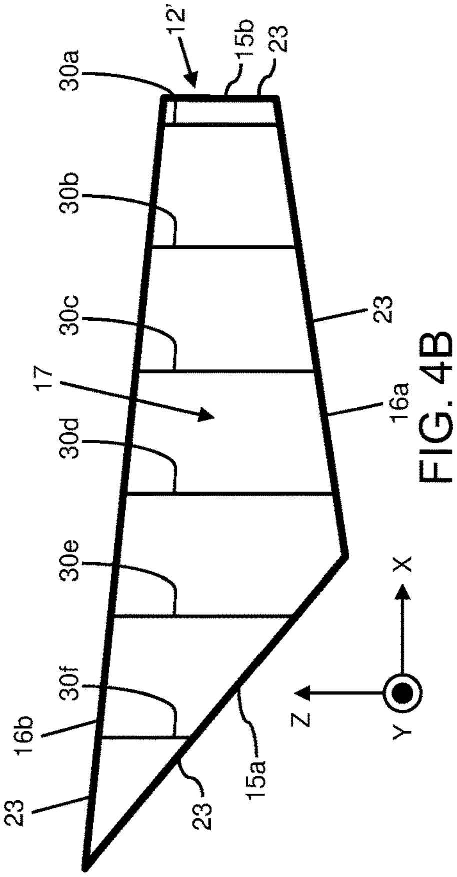
FIG. 4B is a schematic front view of the LOE of FIG. 4A, showing perimeter edges of the LOE onto which a coating of opaque material has been applied, according to embodiments of the present invention.
Figures 4C, 4D, 4E, 4F:
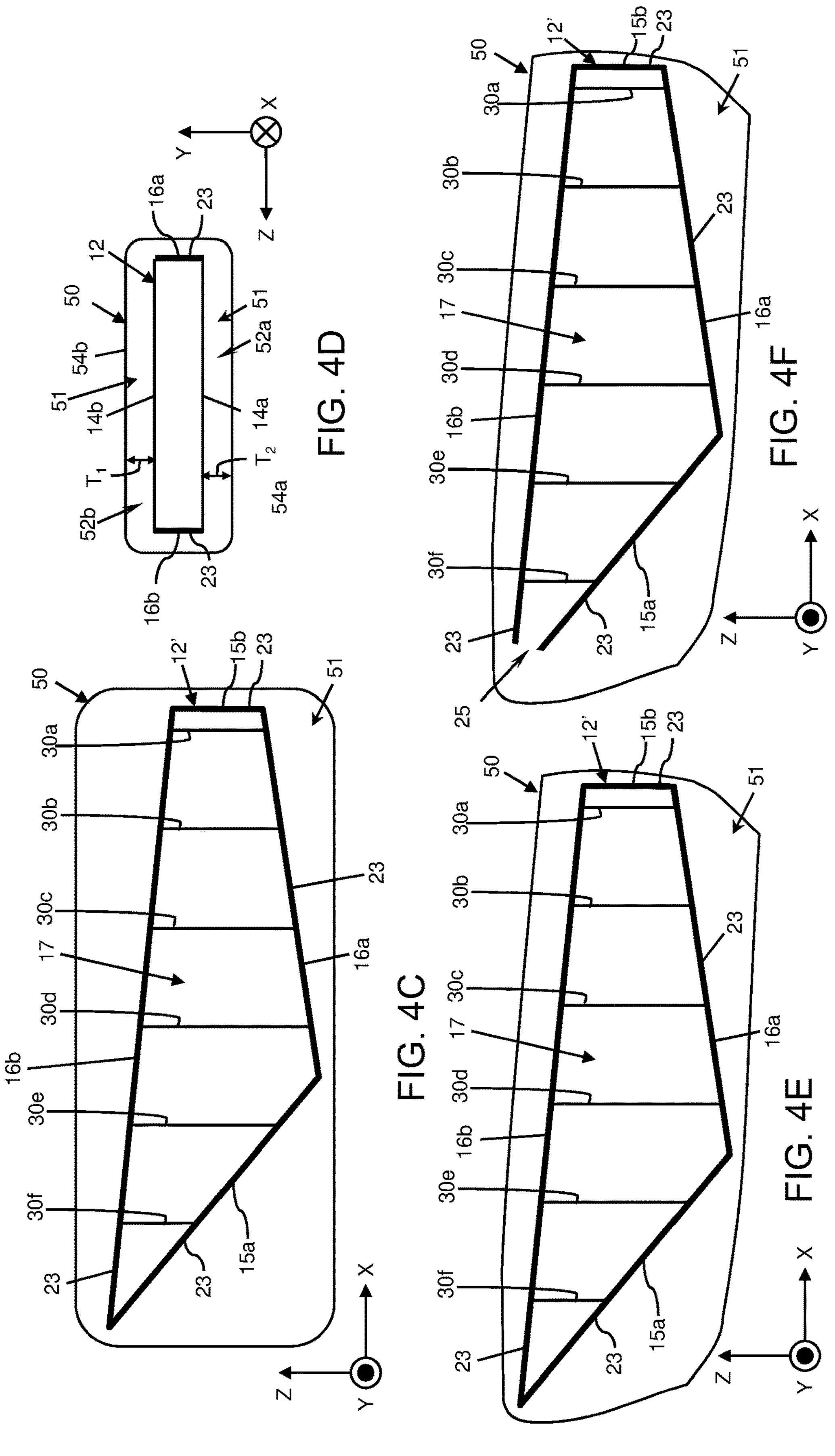
FIGS. 4C and 4D are schematic front and plan views, respectively, of the LOE of FIG. 4B encapsulated by a capsule formed from a transparent material having a refractive index lower than the refractive index of the LOE, according to embodiments of the present invention.
FIG. 4E is a schematic front view of the encapsulated LOE of FIGS. 4C and 4D, showing the capsule after having been trimmed or cut to have an eyepiece contour, according to embodiments of the present invention.
FIG. 4F is a schematic front view of an encapsulated LOE similar to FIG. 4E, but showing the encapsulated LOE after being modified to include a coupling-in region that can accommodate an optical coupling-in configuration, according to embodiments of the present invention.

The modified/pre-cut LOE 12' can then be coated with opaque material 23 at the reduced perimeter edges 15*a*, 15*b*, 16*a*, 16*b*, as illustrated in FIG. 4B. Once coated with the opaque material 23, the coated LOE 12' can then be encapsulated by the capsule 50 (using an encapsulation process, such as any of the encapsulation processes/techniques discussed above) such that the low index material 51 of the capsule 50 is directly attached/bonded to the surfaces 14*a*, 14*b* of the LOE. In certain embodiments, the low index material 51 is also directly attached/bonded to the opaque material 23 at the perimeter edges 15*a*, 15*b*, 16*a*, 16*b*. FIGS. 4C and 4D show different views of the coated LOE 12' by capsule 50 in which the low index material also directly contacts the perimeter edges 15*a*, 15*b*, 16*a*, 16*b*. The surfaces 54*a*, 54*b* of the capsule 50 can then be polished to improve optical quality of the optical device.

As illustrated in FIG. 4E, the encapsulated LOE 12' can optionally be cut or trimmed to achieve a desired eyepiece contour. In particular, the low index material 51 of the capsule 50 can be cut or trimmed to achieve a desired shape having an eyepiece contour. This is particularly useful when the encapsulated LOE is intended to be fit as part of a near-eye display device that is implemented, for example, in an eyeglasses form factor.

In certain embodiments, the LOE 12 or 12' can be modified in order to accommodate placement of an optical coupling-in configuration. Modification of the LOE can be accomplished by cutting/trimming the LOE (prior to encapsulation) to define a coupling-in region of the LOE. FIG. 4F shows an example of the LOE 12' which has been further modified to include coupling-in region 25 (through which the image illumination can be injected) after encapsulation by the capsule 50. A similar modification can be made to the LOE 12. Alternatively, the encapsulated LOE can be modified to provide the encapsulated LOE with a coupling-in region, for example by grinding/cutting/trimming an area/portion of the capsule 50 that is located in the region that will be the coupling-in region.

It is noted that removal of the inactive area of the LOE is not an absolute requirement, and embodiments are contemplated herein in which one or more of the peripheral edges 15*a*, 15*b*, 16*a*, 16*b* of a fully intact LOE (i.e., an LOE having both active and inactive areas) are coated with opaque material.

As previously mentioned, the optical coupling-in configuration (placed at the coupling-in region) functions to inject image illumination generated by an image projector (for example the image projector 18 of FIG. 1) into the LOE for guiding by TIR. As discussed, the optical coupling-in configuration can be appropriately designed in order to accommodate injection of image illumination at angles that include shallow angles. Design of the optical coupling-in configuration may also include appropriate design of the coupling-in region, i.e., appropriately modifying the LOE or encapsulated LOE to produce an appropriate coupling-in region that can accommodate placement of the optical coupling-in configuration.

The encapsulated LOEs according to the embodiments of the present invention provide a number of advantages over conventional unencapsulated LOEs. First, the encapsulated LOEs according to certain embodiments, for example the encapsulated LOE of FIG. 4E which includes a trimmed LOE 12' having only an active area and a capsule 50 trimmed to fit an eyepiece contour, are lighter in weight than their conventional unencapsulated LOE counterparts. Another advantage is that the encapsulated LOEs provide direct mechanical contact of functional elements such as eyeglass frames. Besides such mechanical advantages, the encapsulated LOEs according to embodiments of the present invention provide certain optical advantages over convention unencapsulated LOEs. Some notable optical advantages are the ability to attach additional optical elements, such as lenses, protective films, ghost image reducing coatings/films and the like, directly to the capsule 50 an in association with one of the major surfaces 14*a*, 14*b* without adversely affecting conditions of TIR.

Turning now to FIGS. 5A-8B, there are illustrated examples of encapsulated LOEs having various additional optical elements attached thereto. In all of the examples, a first optical element (72*a*/74*a*/76*a*/78*a*) is directly attached to the capsule 50 at the surface 54*a* so as to be deployed in association with the major surface 14*a* (i.e., in facing relation to the user's eye), and a second optical element (72*b*/74*b*/76*b*/78*b*) is directly attached to the capsule 50 at the surface 54*b* so as to be deployed in association with the major surface 14*b* (i.e., facing away from the user's eye, i.e., on the back side of the LOE). The direct attachment of the optical elements 72*a*/74*a*/76*a*/78*a*, 72*b*/74*b*/76*b*/78*b* to the surfaces 54*a*, 54*b* can be provided, for example, via adhesive bonding. In embodiments in which the capsule 50 is formed from a low index optical adhesive, the low index optical adhesive (having thickness $T_1$ and $T_2$) can also be used to bond the optical elements 72*a*/74*a*/76*a*/78*a*, 72*b*/74*b*/76*b*/78*b* to the LOE at the surfaces 14*a*, 14*b*.

The first optical element 72*a*/74*a*/76*a*/78*a* can be designed and deployed so as to extend across part, most, or all of the surface 54*a* in the lateral direction (x-dimension in the drawings) and the transverse direction (z-dimension in the drawings). Similarly, the second optical element 72*b*/74*b*/76*b*/78*b* can be designed and deployed so as to extend across part, most, or all of the surface 54*b* in the lateral direction and the transverse direction.

Figures 5A, 5B, 6A, 6B:
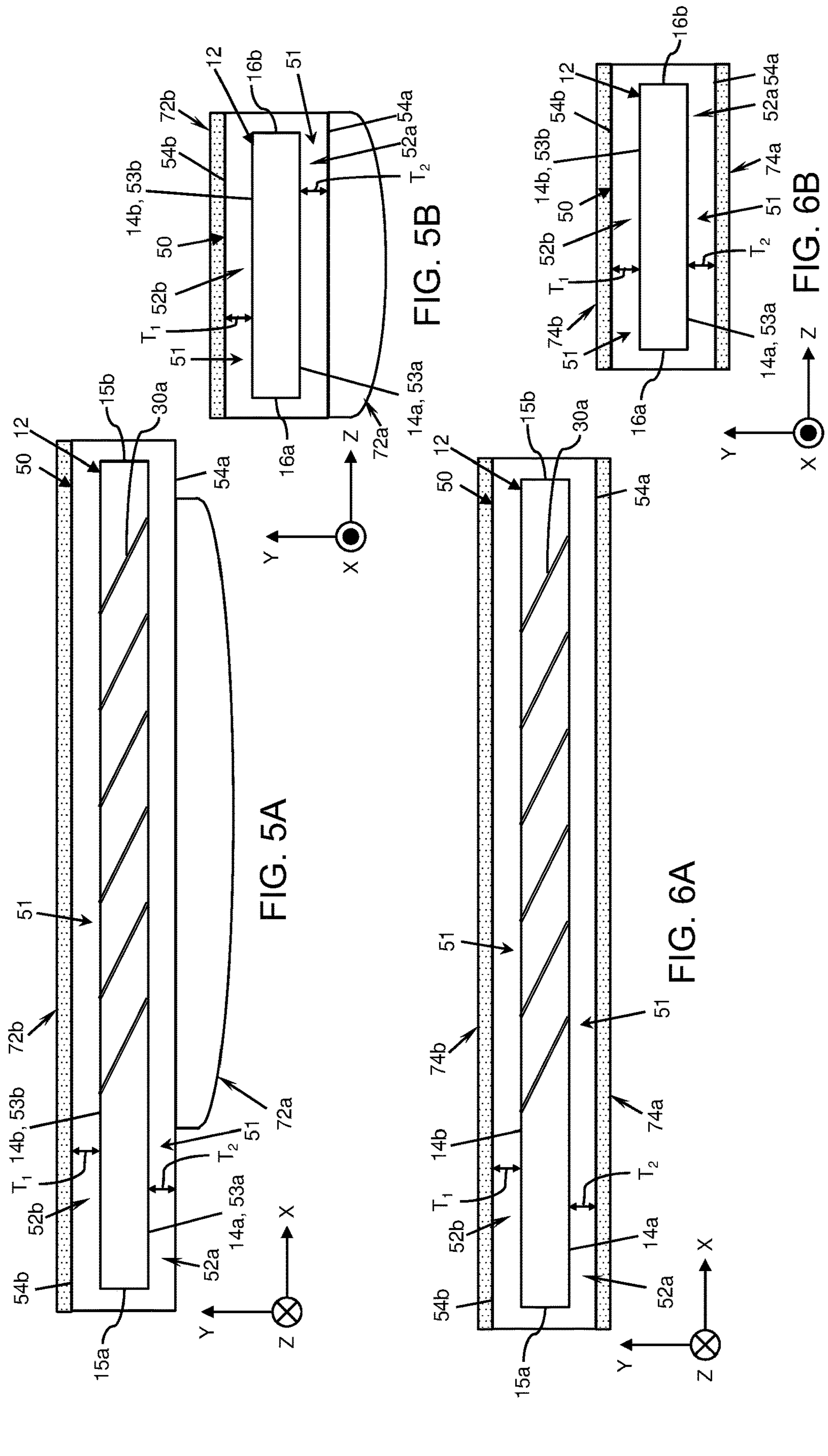
FIGS. 5A and 5B are schematic side and plan views, respectively, of an encapsulated LOE having a lens and a protective film respectively attached to first and second surfaces of the capsule, according to embodiments of the invention.
FIGS. 6A and 6B are schematic side and plan views, respectively, of an encapsulated LOE having first and second protective films respectively attached to first and second surfaces of the capsule, according to embodiments of the invention.

Turning now to FIGS. 5A and 5B, there is shown a first example of optical elements in which the first optical element 72*a* is in the form of a lens (which may be a prescription lens, i.e., an ophthalmic lens), and the second optical element 72*b* is in the form of a protective film (i.e., a safety protective film, such as thin optical protective films).

The lens 72*a* can be designed to apply positive or negative optical power, and depending on the design and deployment location of the lens, can apply such optical power to illumination from an external scene that is viewable by the user through the surfaces 14*a*, 14*b* and may also apply such optical power to the image illumination coupled-out from the LOE 12 e.g., rays 32A, 32B in FIG. 1). In the illustrated example, the lens 72*a* is a plano-convex and thus applies positive power. In addition, the lens 72*a* is shown as partially extending across the surface 54*a* in the lateral direction and fully extending across the portion of the LOE 12 that contains the partially reflecting surfaces 30. Thus, in the illustrated example the lens 72*a* applies positive optical power to light from the external scene as well as image illumination that is coupled-out of the LOE 12 by the partially reflecting surfaces 30.

The protective film 72*b* is shown as fully extending across the surface 54*b* in both lateral and transverse directions. The film 72*b* can be a protective safety film that protects the LOE 12 from damage, for example chipping, shattering, breaking. The film 72*b* may also be a barrier film (available, for example from 3M) that provides an anti-scratch or scratch-resistant coating, and/or protection against dirt or other particulates or contamination from coming into contact with the LOE.

With reference to FIGS. 6A and 6B, there is shown a second example of optical elements in which both the first optical element 74*a* and the second optical element 74*b* are implemented as a protective film (similar to the optical element 72*b* in FIGS. 5A and 5B). In this example, the films 74*a*, 74*b* extend across the entirety of the surfaces 54*a*, 54*b* in both lateral and transverse directions.

Figure 7B:
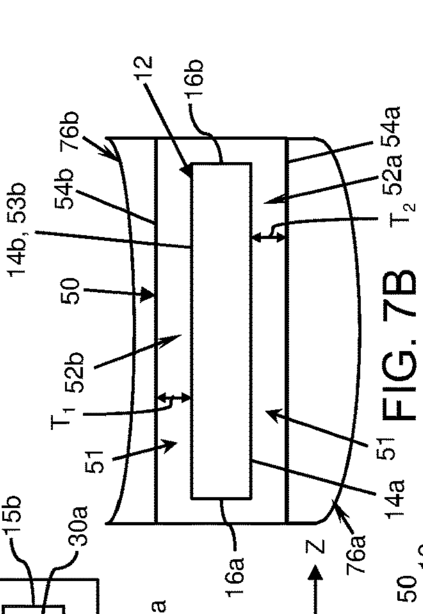
FIGS. 7A and 7B are schematic side and plan views, respectively, of an encapsulated LOE having first and second lenses respectively attached to first and second surfaces of the capsule, according to embodiments of the invention.
Figure 7A:
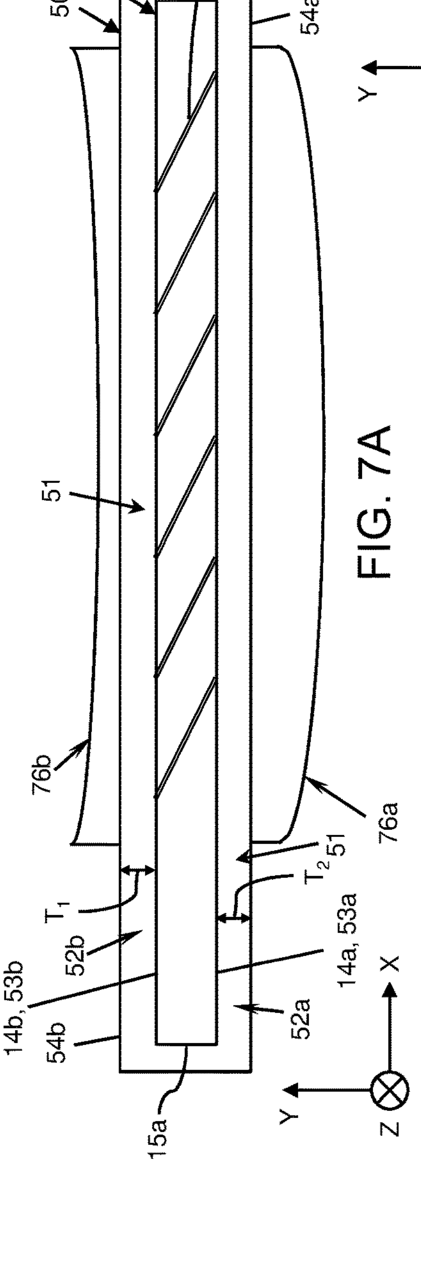

FIGS. 7A and 7B illustrate a third example of optical elements. In this example, the first optical element 76*a* is implemented as a first lens, and the second optical element 76*b* is implemented as a second lens, each of which can apply optical power. Here, the first lens 76*a* is a plano-convex (positive) lens (similar to the lens 72*a* in FIGS. 5A and 5B) and the second lens 76*b* is a plano-concave (negative) lens, thus the two lenses 76*a*, 76*b* in combination provide double optical power. In the illustrated example, the first lens 76*a* extends partially across the surface 54*a* in the lateral direction and fully extends across the surface 54*a* in the transverse direction. Similarly, the second lens 76*b* extends partially across the surface 54*b* in the lateral direction and fully extends across the surface 54*b* in the transverse direction.

Figure 8B:
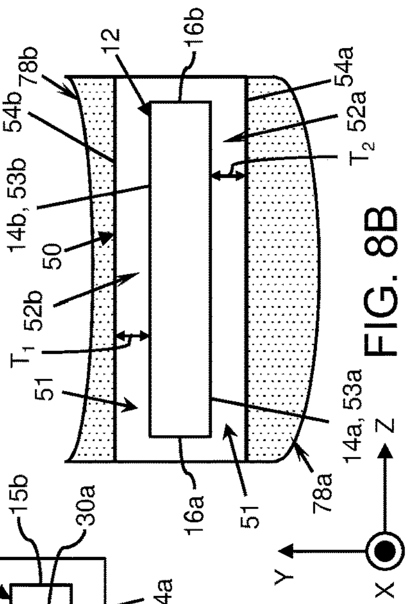
FIGS. 8A and 8B are schematic side and plan views, respectively, of an encapsulated LOE having first and second lenses, each having a protective coating or film applied thereto, respectively attached to first and second surfaces of the capsule, according to embodiments of the invention.
Figure 8A:
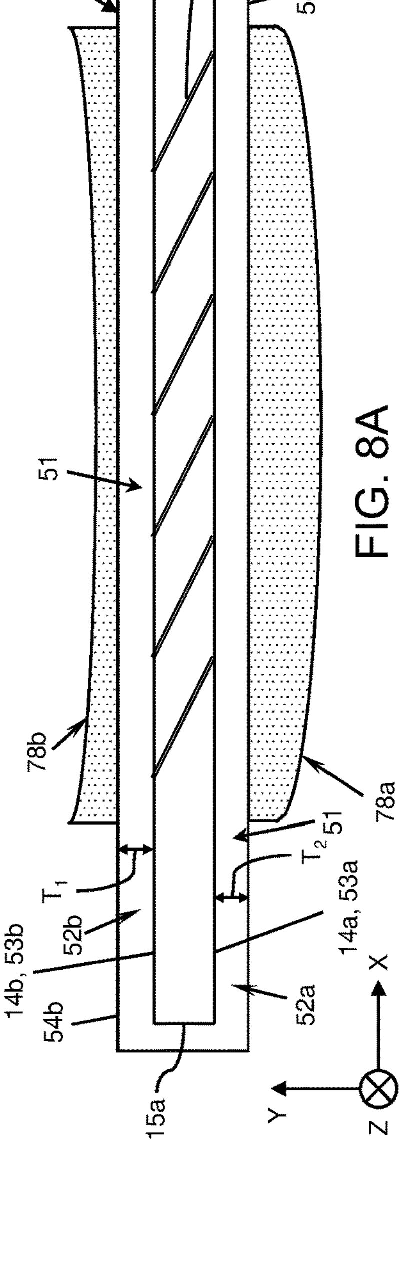

Turning now to FIGS. 8A and 8B, there is illustrated a fourth example of optical elements. In this example, the first optical element 78*a* and the second optical element 78*b* are both optical power and protective lenses, meaning that both lenses provide optical power and protection functionality. Specifically, the lens 78*a*, which can be a positive or negative lens but in the illustrated example is shown as a plano-convex (positive) lens (similar to lenses 72*a*, 76*a*), has a protective film or coating (having properties akin to the films 72*b*, 74*a*, 74*b*) applied thereto. Similarly, the lens 78*b*, which can be a positive or negative lens but in the illustrated example is shown as a plano-concave (negative) lens (similar to lens 76*b*), has a protective film or coating (having properties akin to the films 72*b*, 74*a*, 74*b*) applied thereto. In the illustrated example, the lenses 78*a*, 78*b* fully extend across the respective surfaces 54*a*, 54*b* in the transverse direction, but only partially extend across the respective surfaces 54*a*, 54*b* in the lateral direction.

It is emphasized that the configurations illustrated in FIGS. 5A-8B are merely an exemplary subset of possible configurations envisioned according to embodiments of the present invention, and other configurations, including configurations having combinations of multiple optical elements deployed in association with both of the major surfaces 14*a*, 14*b* and configurations having only one of the major surfaces 14*a*, 14*b* having one or more optical elements deployed in association therewith, fall within the scope of the present invention. For example, embodiments are contemplated in which a protective film is applied at the surface 54*a* (similar to as in FIGS. 6A and 6B) and a lens (for example a negative lens) is applied at the surface 54*b*.

Although the embodiments described thus far have pertained to LOEs having an optical coupling-out configuration 30 implemented as a set of mutually parallel partially reflecting internal surfaces at least partially traversing the LOE and oblique to the surfaces 14*a*, 14*b* (i.e., facets deployed within the LOE), the set partially reflecting surfaces is merely illustrative of one non-limiting implementation of an optical coupling-out configuration, and other optical coupling configurations can be used to couple image illumination out of the LOE 12. The optical coupling-out configuration may be any optical coupling arrangement which deflects part of the incident image illumination already propagating within the LOE 12 by TIR to an angle such that the deflected part of the image illumination exits the LOE 12. Other examples of such suitable optical coupling arrangements include, but are not limited to, one or more diffractive optical elements (e.g., diffractive gratings) deployed on either of the surfaces 14*a*, 14*b* (most suitably used when the optical coupling-in configuration is implemented as one or more diffractive elements), and a beam-splitter arrangement.

The embodiments described thus far have pertained to encapsulation of LOEs that are configured to perform aperture expansion in one dimension (approximately in the x-dimension in the arbitrarily labeled coordinate system used in the drawings). However, encapsulation of LOEs that perform two-dimensional aperture expansion using the encapsulation methodologies/techniques described above also falls within the scope of the present invention. In fact, the encapsulation methodologies described herein may in certain cases be more applicable to LOE architectures that perform two-dimensional aperture expansion. Various solutions for LOE-based optical devices that perform two-dimensional aperture expansion have been developed over the years, including two exemplary classes of solutions developed by Lumus Ltd (Israel), each of which is based on two sets of partially reflective surfaces (i.e., two sets of optical coupling configurations) within two respective regions of an LOE (implemented as one or more light-transmitting substrates) that each deflect a proportion of propagating image illumination.

In one of the exemplary classes of solutions developed by Lumus, and described in various publications, including, for example, PCT publication no. WO 2020/049542, two-dimensional aperture expansion is achieved using what is referred to as "compound LOEs". In general terms, these compound LOEs employ two regions, each of which is a parallel-faced slab of transparent (i.e., light-transmitting) material for facilitating the propagation of collimated image illumination by TIR at parallel major external surfaces, and each of which includes an optical coupling configuration (for example a set of mutually parallel partially reflecting internal surfaces (i.e., facets deployed within the LOE) or diffractive elements), which redirect the image illumination while achieving expansion of the optical aperture.

In another of the exemplary classes of solutions, also developed by Lumus, and described in various publications, including, for example, U.S. Pat. No. 10,133,070, two-dimensional aperture expansion is achieved utilizing a first rectangular LOE optically coupled with a second slab-type LOE, each of which supports propagation of image illumination by internal reflection. In general terms, these rectangular LOE based solutions also employ two regions, the first of which includes the rectangular LOE which is formed as an elongated substrate having two pairs of planar parallel major external surfaces that form a rectangular cross-section. The rectangular LOE supports propagation of image illumination by total internal reflection at the two pairs of major external surfaces (referred to as four-fold total internal reflection). The second region includes the slab-type LOE, which is optically coupled with the rectangular LOE, and which has a form similar to the LOE of FIG. 1. In other words, the second slab-type LOE has a pair of major parallel surfaces and a set of internal partially reflective surfaces (facets) inclined oblique to the major parallel surfaces. The rectangular LOE also has a set of parallel facets angled obliquely to the direction of elongation of the rectangular LOE, which deflects a proportion of the image illumination that propagates through the rectangular LOE into the second LOE so as to be guided through the second LOE by TIR at the pair of parallel major surfaces of the second LOE. A proportion of the image illumination that propagates through the second LOE is deflected by the facets of the second LOE so as to be coupled out of the second LOE toward the eye of the observer.

Accordingly, the optical coupling-out configuration 30 described within the context of one-dimensional aperture expansion can more generally be referred to as an optical coupling configuration 30 that deflects a proportion of the image illumination that is guided within the LOE, and LOE architectures that performs two-dimensional aperture expansion can include two (or more) such optical coupling configurations each for deflecting image illumination propagating through LOE regions by TIR. In embodiments in which the LOE is configured to perform aperture expansion in one dimension only, the optical coupling configuration 30 deflects the proportion of guided image illumination out of the LOE towards the user.

Bearing the above in mind, the following paragraphs describe embodiments of at least partially encapsulated two-dimensional aperture expanding LOEs. First, embodiments of an at least partially encapsulated compound LOE will be described, and then embodiments of an at least partially encapsulated rectangular LOE based arrangement will be described.

Figure 9B:
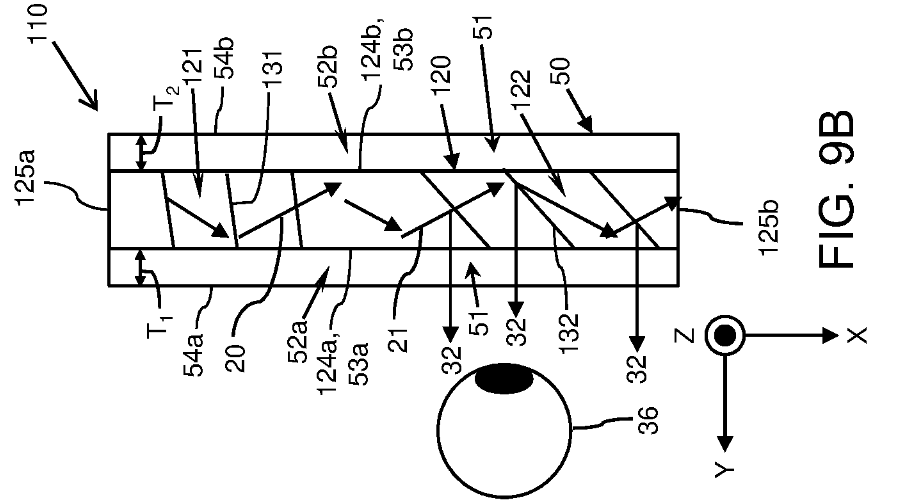
FIGS. 9A and 9B are schematic front and side views, respectively, of an optical device having an LOE configured for performing two-dimensional aperture expansion encapsulated by a capsule formed from a transparent material having a refractive index lower than the refractive index of the LOE, according to embodiments of the present invention.
Figure 9A:
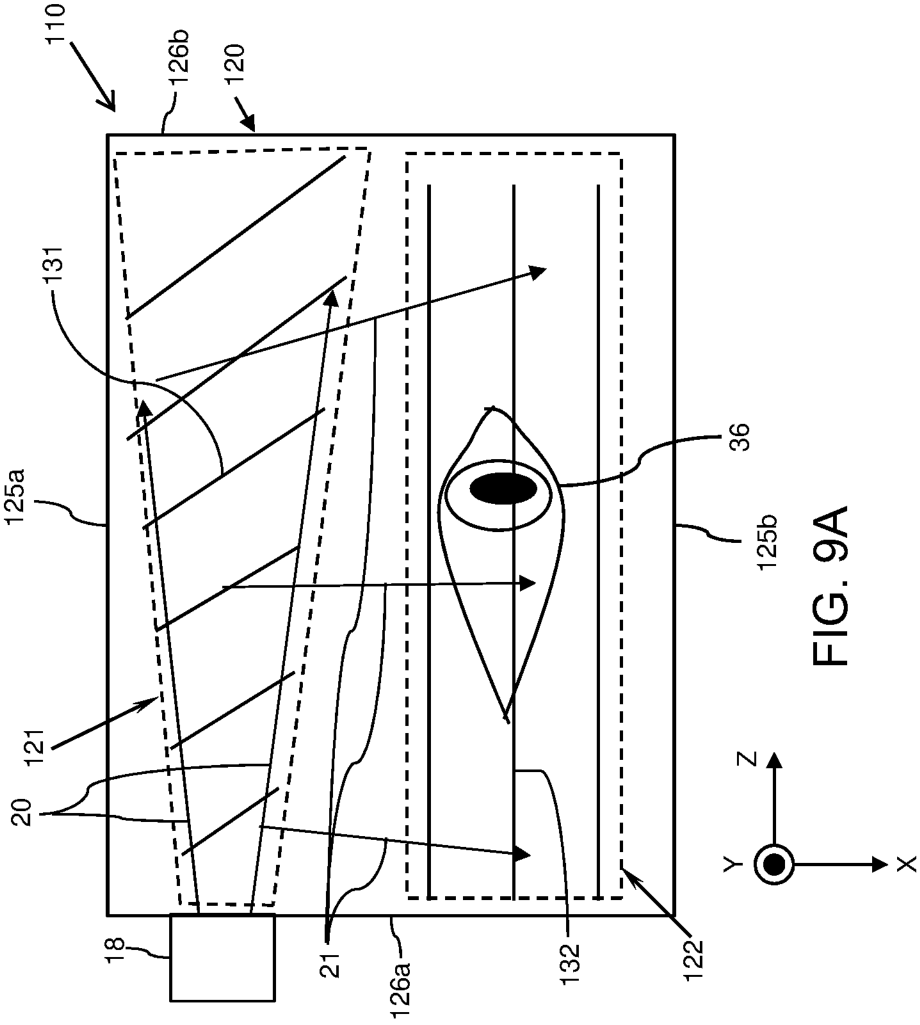

Referring now to FIGS. 9A and 9B, there is shown different views of an example of an optical device 110 having an encapsulated compound LOE 120 having two optical coupling configurations 131, 132 located in two respective regions of the LOE, each of which deflects propagating image illumination. The LOE 120 is formed as a slab of transparent (i.e., light-transmitting) material having a pair of parallel major external surfaces (faces) 124*a*, 124*b*, and has a first region 121 (also referred to herein as "LOE1" which is demarcated by dashed lines in FIG. 9A) containing the first optical coupling configuration 131 and a second region (also referred to herein as "LOE2" which is demarcated by dashed lines in FIG. 9A) containing the second optical coupling configuration 132. In the non-limiting example embodiment illustrated in the drawings, the first optical coupling configuration 131 is implemented as a first set of planar mutually-parallel partially-reflecting internal surfaces (facets) having a first orientation, and the second optical coupling configuration 132 is implemented as a second set of planar mutually-parallel partially-reflecting internal surfaces (facets) having a second orientation non-parallel to the first orientation. It should be noted, however, that the optical coupling configurations 131, 132 can also be implemented as diffractive optical elements (e.g., diffractive gratings) deployed on either of the surfaces 124*a*, 124*b*.

Parenthetically, in certain embodiments the general steps for producing optical devices having an encapsulated compound LOE are similar to those used for producing optical devices having encapsulated LOEs that perform one-dimensional aperture expansion. In such embodiments, these steps generally include obtaining the LOE, and then at least partially encapsulating the obtained LOE by directly attaching the low index material to the major external surfaces of the LOE. As in the one-dimensional embodiments, the low index material may extend across the entirety of the length of the major external surfaces (full encapsulation) or may extend across the vast majority of the length of the major external surfaces (partial encapsulation). Obtaining the LOE may, in certain embodiments, include fabricating the LOE. Methods for fabricating compound LOEs have been described extensively in various publications by Lumus Ltd. (Israel), including, for example, in the aforementioned PCT publication no. WO 2020/049542. In other embodiments, the encapsulation step may be performed as an additional step of the compound LOE fabrication process.

In embodiments in which the optical coupling configurations 131, 132 are implemented as sets of facets (as shown in the drawings), the first orientation generally refers to the facets 131 being inclined obliquely to the direction of propagation image illumination, and the second orientation refers to the facets 132 being non-parallel to the facets 131 and also being inclined obliquely to the surfaces 124*a*, 124*b*. In one set of non-limiting examples, the first orientation can also be such that the facets 131 are orthogonal to the major surfaces 124*a*, 124*b*, while in another set of non-limiting examples the first orientation can also be such that the facets 131 are obliquely angled relative to the major surfaces 124*a*, 124*b*.

The mutually-parallel major external surfaces 124*a*, 124*b* extend across the first and second regions 121 and 122 such that both the first set of partially-reflecting surfaces 131 and the second set of partially-reflecting surfaces 131 are located between the major external surfaces 124*a*, 124*b*.

Image illumination, represented here schematically by sample rays 20, corresponding to a collimated image generated by image projector 18, propagates within the first region 121 of the LOE 120 by TIR at the surfaces 124*a*, 124*b*. The first optical coupling configuration 131 deflects part of the image illumination from a first direction of propagation trapped/guided by TIR within the first region 121 of the LOE 120 to a second direction of propagation, also trapped/guided by TIR within the LOE 120. The deflected image illumination (represented here schematically by sample rays 21) then passes from the first region 121 into the second region 122, in which the second optical coupling configuration 132 deflects part of the TIR-guided image illumination so as to progressively couple a proportion of the image illumination (represented schematically in FIG. 9B as sample rays 32) out of the LOE 120 and towards the eye 36 of the observer/user located within the EMB, thereby achieving a second dimension of optical aperture expansion.

It is noted that in drawings corresponding to the compound LOE embodiments, only the in-plane propagation directions of the rays are illustrated during propagation within the LOE, but the rays actually follow a zigzag path of repeated internal reflection from the two major external surfaces 124*a*, 124*b* (similar to as shown in FIG. 1), and one entire dimension of the image field of view is encoded by the angle of inclination of the rays relative to the major external surfaces, corresponding to the pixel position in the Y dimension.

The LOE 120 also includes additional external (perimeter) surfaces (edges) 125*a*, 125*b*, 126*a*, 126*b* which may or may not be pairs of parallel surfaces. It is noted that in the illustrated example, the low index material 51 of the capsule 50 is only in direct contact with parallel major surfaces 124*a*, 124*b* of the LOE 120 but is not in contact with the perimeter surfaces (edges) 125*a*, 125*b*, 126*a*, 126*b* of the LOE 120. However, it should be apparent that other configurations are possible in which the low index material is in direct contact with one or more of the perimeter surfaces (edges) 125*a*, 125*b*, 126*a*, 126*b*.

Figure 10:
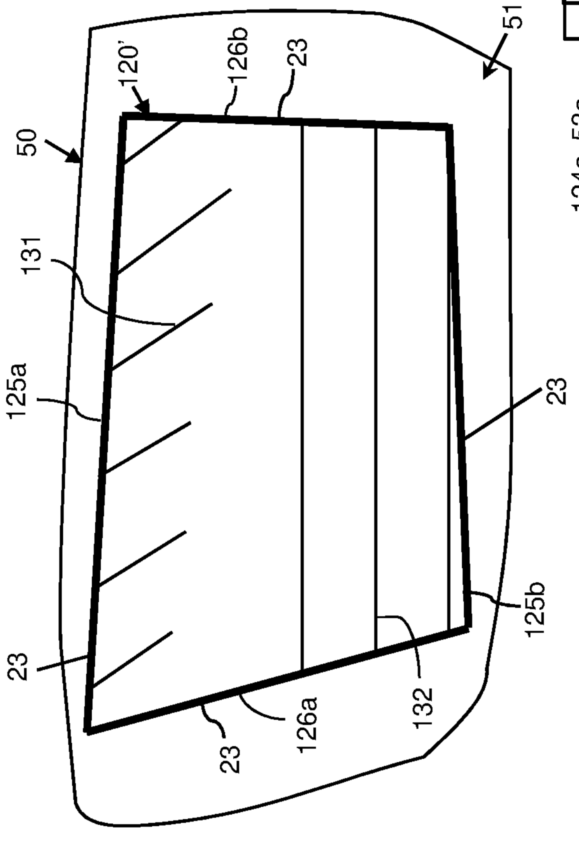
FIG. 10 is a schematic front view of the encapsulated LOE of FIGS. 9A and 9B, showing the capsule after having been trimmed or cut to have an eyepiece contour, according to embodiments of the present invention.

In certain embodiments, the edges 125*a*, 125*b*, 126*a*, 126*b* can be coated with an opaque material to reduce scattering, similar to as described above in the context of the one-dimensional aperture expanding LOE 12. In addition, similar to the LOE 12, the compound LOE 120 has an active area and an inactive area. Thus, similar to as previously described in the context of the LOE 12, a compound LOE having only an active area can be obtained (for example by trimming/cutting the compound LOE 120 to remove the inactive area), and the perimeter edges of the trimmed compound LOE can be coated with the opaque material. FIG. 10 illustrates an example of a compound LOE 120' that has been trimmed to remove most or all of the inactive area, and in which the resulting perimeter edges 125*a*, 125*b*, 126*a*, 126*b* have been coated with opaque material 23. In this example, the low index material 51 of the capsule 50 is also shown as being in direct contact with the coated perimeter edges 125*a*, 125*b*, 126*a*, 126*b*.

Figure 11:
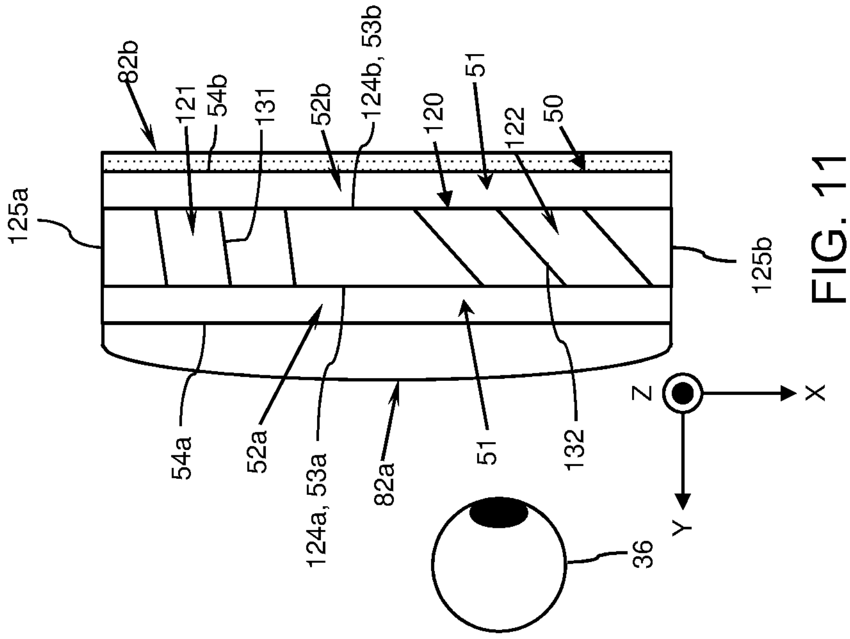
FIG. 11 is a schematic side view of an encapsulated LOE similar to FIG. 9B, showing a lens and a protective film respectively attached to first and second surfaces of the capsule, according to embodiments of the invention.

Similar to the LOE described with reference to FIGS. 5A-8B, the LOE 120 can have additional optical elements attached thereto via direct attachment to the capsule 50 at the external surfaces 54*a*, 54*b* of the low index material 51, including combinations of lenses and protective films. FIG. 11 illustrates one non-limiting example configuration in which a first optical element 82*a* (represented here as a lens, e.g., an ophthalmic lens) is attached at the front surface 54*a* of the capsule 50, and a second optical element 82 (represented here as a protective film) is attached at the back surface 54*b* of the capsule 50. Although only one example configuration, in which the optical elements 82*a* and 82*b* are implemented as a lens and a protective film, respectively, is illustrated in the drawings, it should be clear that any of the combinations of lenses and/or protective films discussed above in the context of LOEs that perform one-dimensional aperture expansion are also applicable here in the context of LOE 120 that performs two-dimensional aperture expansion.

It is noted that although FIG. 11 shows the lens 82*a* as extending along the entirety of the surface 54*a* in the lateral dimension (x-dimension in the figure) so as to extend along the entirety of the major surface 124*a* in the lateral dimension such that the lens 82*a* is associated with portions of the major surface 124*a* in each of the regions 121, 122 of the LOE 120, in certain cases, the dimensions of the lens 82*a* may be limited such that the lens 82*a* extends only across a portion of the surface 54*a* in the lateral dimension such that the lens 82*a* is only associated with portions of the major surface 124*a* that are in the second region 122 of the LOE 120. This may, in certain cases, be more practical since it is in the second region 122 of the LOE 120 from which image illumination is deflected out by the facets 132, and also through which the eye 36 can view the external scene (via the major surfaces 124*a*, 124*b*).

Figure 12:
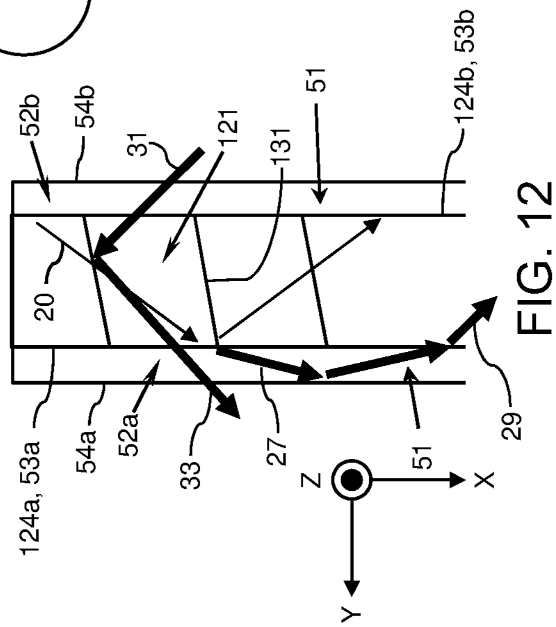
FIG. 12 is a schematic partial side view of the LOE of FIGS. 9A and 9B, showing escaped light from the LOE reflected back into the LOE by an external surface of the capsule, and also showing light from an external scene reflected toward a user by an optical coupling configuration associated with the LOE.

As mentioned in previous sections of the present disclosure, the thicknesses ($T_1$ and $T_2$) of the two regions 52*a*, 52*b* (which respectively correspond to the layer(s) of the low index material 51 of the capsule 50 extending across the length of the surfaces 124*a* and 124*b*) are exaggerated for clarity in the drawings in order to better explain the principles of the present invention, but it may be particularly advantageous to keep the thicknesses of the two regions 52*a*, 52*b* relatively small to increase optical performance while at the same time reducing the overall bulk of the optical device. Specifically, the thickness of the low index material 51 at the surfaces 124*a*, 124 is preferably sufficiently small such that surface patterns of the low index material 51 follow blemish patterns at the surfaces 124*a*, 124*b* such that TIR-guided illumination that escapes the LOE 120 through the surfaces 124*a*, 124*b* most often also escape out of the low index material 51 so as not to be reintroduced back into the LOE 120. However, situations may arise in which image illumination that deviates from the main image escapes from the LOE 120 and into one or both of the regions 52*a*, 52*b* and is reflected at the surface 54*a* or 54*b* by TIR (due to the escaped illumination impinging on the surface 54*a* or 54*b* at an angle of incidence greater than a critical angle defined by the refractive index of the low index material 51 and the medium surrounding the capsule 50, which is typically air) back into the LOE 120 as scattered light. In addition, situations may arise in which light from a scene (e.g., external scene) can enter the LOE and be reflected by one of the optical coupling configurations towards the user's eye. These situations are schematically illustrated in FIG. 12, which shows an enlarged partial side view of the first region 121 of the LOE 120. As illustrated in FIG. 12, illumination (represented schematically as thick sample ray 27) that deviates from the main TIR-guided image 20 and escapes from the LOE 120 (via the surface 124*a*) into region 52*a* of the capsule 50 is reflected by TIR at the surface 54*a* and then re-enters the LOE 120 (via the surface 124*a*) as scattered light (represented schematically as thick sample ray 29). Also shown is light (represented schematically as thick sample ray 31) from an external scene that enters the LOE 120 (via the surface 124*b*) and is deflected/reflected by the optical coupling configuration 131 as reflected light (represented schematically as thick sample ray 33) toward the user's eye 36.

Figure 13B:
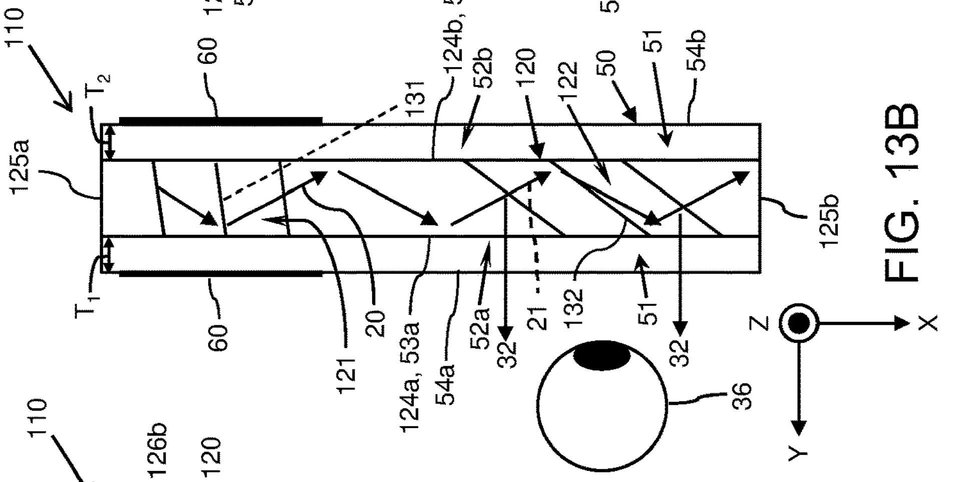
FIGS. 13A and 13B are schematic front and side views similar to FIGS. 9A and 9B, showing a light-absorbing material associated with portions of the transparent material that form the capsule, according to embodiments of the present invention.
Figure 13A:
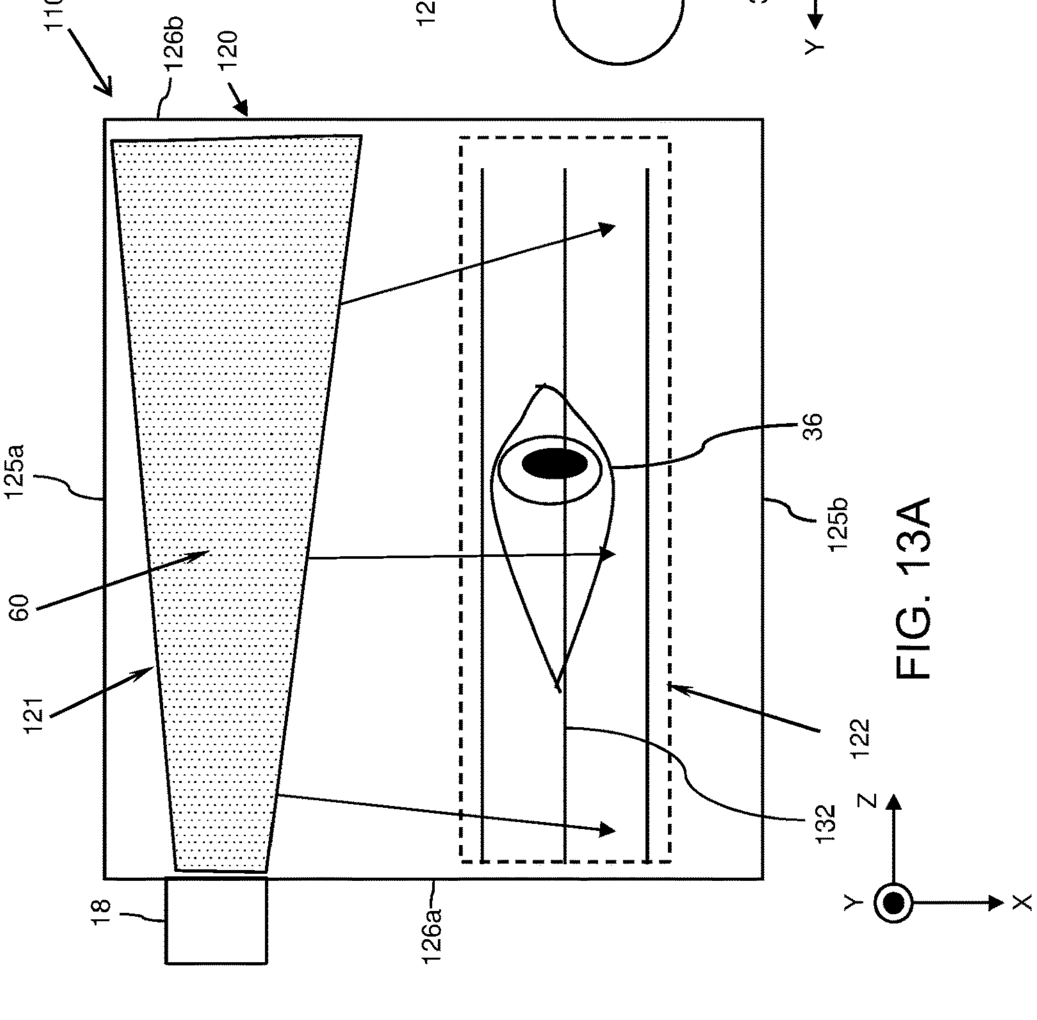

In order to mitigate scattering and unwanted reflections in the above-mentioned scenarios, certain embodiments of the present disclosure provide one or more layers of a light-absorbing material at one or more portions of the low index material 51. With reference now to FIGS. 13A and 13B, there are shown different views of the optical device 110 having light-absorbing material 60 deployed in association with portions of the low index material 51, preferably via direct attachment to the portions of the low index material 51. In the illustrated example, the light-absorbing material 60, which can be implemented for example as one or more layers of black paint, is directly deposited or coated on a minority portion (surface area) of each of the surfaces 54*a*, 54*b* of the low index material 51 that is directly attached to the surfaces 124*a*, 124*b* in the first region 121 of the LOE 120. The minority portion of the surfaces 54*a*, 54*b* of the low index material 51 that is covered by the light-absorbing material 60 constitutes roughly the entire surface area of the low index material 51 that covers the area spanned by the projection of the first optical coupling configuration 131 in the xz plane, and preferably includes the surface area of the low index material 51 that extends slightly beyond this spanned area. This helps to ensure that illumination from the external scene arriving at the optical device at angles that would otherwise support entry to the LOE and deflection from the optical coupling configuration 131 are absorbed by the light-absorbing material 61. Roughly speaking, the area of the low index material 51 that is covered by the light-absorbing material 60 includes roughly the entire surface area of the low index material 51 that covers the first region 121 of the LOE 120 and may also include some of an intermediate region of the LOE 120 between the regions 121, 122 (or some of the second region 122) so as to extend slightly beyond the projection of the first optical coupling configuration 131 in the xz plane. By proportion, the minority portion of the surfaces 54*a*, 54*b* of the low index material 51 that is covered by the light-absorbing material 60 makes up approximately 10-20% of the surface area of the low index material deployed at each of the surfaces 124*a*, 124*b*.

Figure 14:
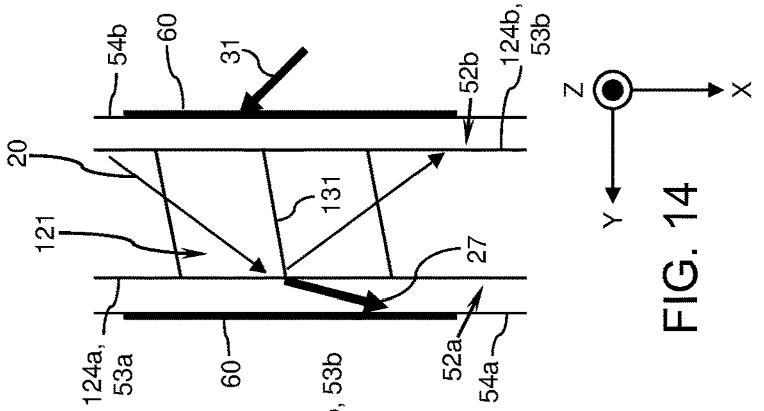
FIG. 14 is a schematic partial side view of the LOE of FIGS. 13A and 13B, showing the light-absorbing material absorbing escaped light from the LOE and light from an external scene, according to embodiments of the present invention.

FIG. 14 schematically illustrates the effect of the light-absorbing material on escaped illumination (ray 27) and scene illumination (ray 31). As shown, illumination 27 that deviates from the main TIR-guided image 20 and escapes the LOE 120 (via the surface 124*a*) into region 52*a* of the capsule 50 is absorbed by the light-absorbing material 60 deployed at the surface 54*a*, thereby preventing the occurrence of TIR at the surface 54*a* and preventing re-entry of scattered light into the LOE 120. Also as shown, illumination 31 from an external scene is absorbed by the light-absorbing material 60 deployed at the surface 54*b*, thereby preventing deflection/reflection of the illumination 31 by the optical coupling configuration 131 toward the user's eye.

In order to prevent Fresnel reflections or TIR reflections, the light-absorbing material 60 preferably has a refractive index that is the same as (i.e., equal to) or slightly higher than the refractive index of the low index material 51 that forms the capsule 50. By slightly higher, it is meant that the refractive index of the light-absorbing material 60 is preferably no more than 10% larger/greater (and more preferably no more than 5% larger/greater) than the refractive index of the low index material 51 from which the capsule 50 is formed.

Since the eye 36 is located in the EMB which located in front of the second region 121 of the LOE 120, the layer(s) of light-absorbing material 60 does/do not interfere with the user's visibility of the image illumination coupled-out by the second optical coupling configuration 131 or the user's visibility of the external scene, which is viewable through the surfaces 124*a*, 124*b*.

Figure 15:
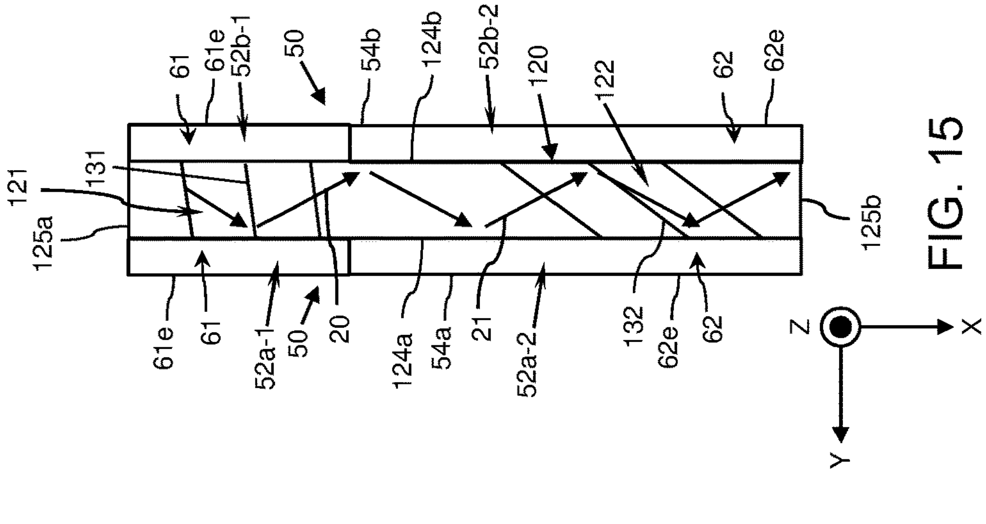
FIG. 15 is a schematic side view showing an encapsulated LOE similar to as shown in FIG. 9B, but in which the capsule is formed from two transparent materials each having a refractive index lower than the refractive index of the LOE, according to embodiments of the present invention.

As mentioned above, in certain embodiments the capsule 50 can be formed from more than one low index material. FIG. 15 illustrates a non-limiting example of such an embodiment in which a first low index material 61 is directly attached to the portions of the surfaces 124*a*, 124*b* that are in the first region 121, and a second low index material 62 is directly attached to the portions of the surfaces 124*a*, 124*b* that are in the second region 122. The second low index material 62 is a transparent material, and the first low index material may or may not be a transparent material. Here, the first region 52*a* of the capsule 50 is sub-divided into two sub-regions 52*a*-1 and 52*a*-2, and the second region 52*b* of the capsule 50 is sub-divided into two sub-regions 52*b*-1 and 52*b*-2. The first low index material 61 is in the sub-regions 52*a*-1 and 52*b*-1, whereas as the second low index material 62 is in the sub-regions 52*a*-2 and 52*b*-2. The two low index materials 61, 62 are adjacently placed to form the capsule, and thus cooperate to at least partially encapsulate the LOE. In other words, a part of the capsule 50 is formed from the first low index material 61, and another part of the capsule 50 is formed from the second low index material 62. Preferably, at each of the major external surfaces 124*a*, 124*b* of the LOE 120, the external surface 62*e* of the second low index material 62 that is attached to the major external surface of the LOE 120 is a continuation of the external surface 61*e* of the first low index material 61 that is attached to the major external surface of the LOE 120, thereby forming the external surfaces 54*a*, 54*b* of the capsule 50.

Preferably, the two low index materials 61, 62 have the same or similar refractive index. However, this is not an absolute requirement, and the LOE 120 can still provide two-dimensional aperture expansion despite variations in the refractive indices between the two materials 61, 62. For example, the first low index material 61 can have a refractive index of approximately 1.2, and the second low index material 62 can have a refractive index of 1.3.

In certain embodiments, the first low index material 61 is a transparent material. In other embodiments, the first low index material 61 is a light-absorbing material having a low refractive index, implemented, for example, as black paint with inherently low refractive index (e.g., refractive index of approximately 1.3). In such other embodiments, the first low index material 61 performs multiple functions, including, for example, i) preserving conditions of TIR at the portions of the major external surfaces 124*a*, 124*b* that are in the first region 121, ii) preventing illumination from the external scene, that would otherwise enter the LOE 120 via the portions of the major external surfaces 124*a*, 124*b* that are in the first region 121 and deflect from the first optical coupling configuration 131, from entering the LOE 120 by absorbing the external scene illumination, and iii) preventing TIR-guided illumination that escapes the LOE 120 through the portions of the major external surfaces 124*a*, 124*b* that are in the first region 121 from re-entering the LOE 120 by absorbing the scaped illumination.

It is noted that in embodiments in which the first low index material 61 is a low index light-absorbing material, the first low index material 61 preferably covers the same or similar surface area of the major external surfaces 124*a*, 124*b* with which the light-absorbing material 60 of FIGS. 13B and 14 is associated. In other words, the first low index material 61 preferably covers the surface area of the major external surfaces 124*a*, 124*b* that is spanned by, and preferably extends slightly beyond, the projection of the first optical coupling configuration 131 in the xz plane.

In addition, since the low index material 61 is itself a light-absorbing material in such other embodiments, no additional layer of light-absorbing material (for example as illustrated in FIGS. 13B and 14) may be necessary.

Figure 16B:
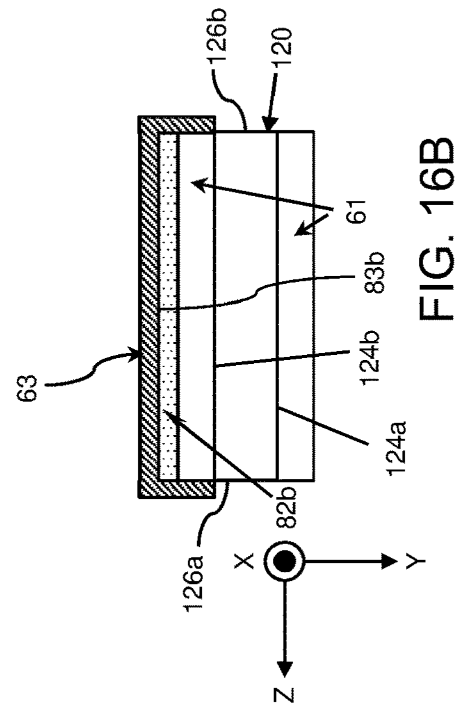
FIGS. 16A and 16B are schematic side and plan views, respectively, of an encapsulated LOE similar to the LOE shown in FIG. 15, but also showing a protective film on the transparent materials on one side of the LOE and an additional coating layer on a portion of the protective film, according to embodiments of the present invention.
Figure 16A:
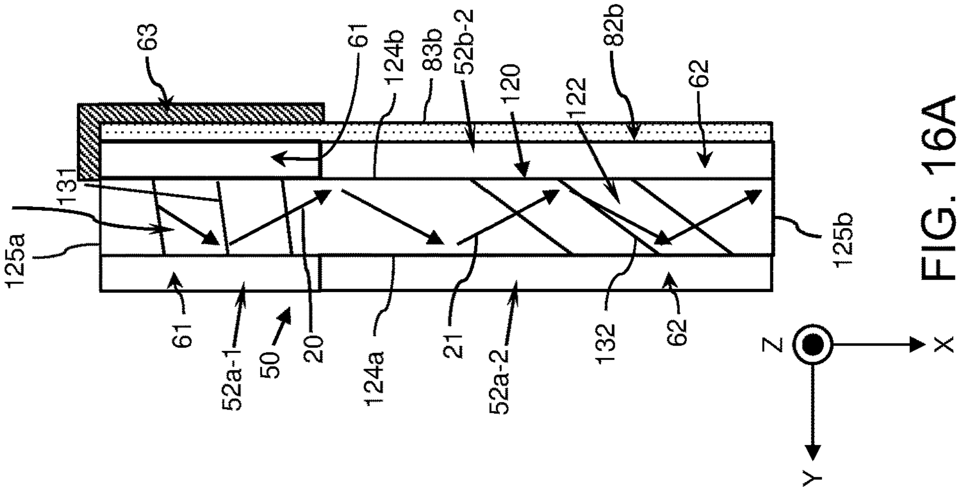

In certain cases, in particular embodiments in which an additional optical element (e.g., a protective film) is attached to the LOE via the low index material (or low index materials), it may be advantageous to apply an additional coating layer or layers to all or part of the exposed surfaces of the optical element to increase mechanical stability and to help block unwanted light from the external scene entering the LOE. One exemplary material that can be used for the additional coating layer(s) is anti-reflective (AR) coating, which provides rigidity (mechanical stability) and anti-reflection properties. Another exemplary material that can be used for the additional coating layer(s) is a light-absorbing material, e.g., black paint. FIGS. 16A and 16B illustrate various views of an LOE according to one non-limiting example embodiment in which a coating 63 (e.g., one or more layers of AR coating, one or more layers of black paint) is applied to portions of a protective film 82*b* (e.g., a thin optical protective film) that is attached to the low index material (or materials) that is attached to one of the major external surfaces 124*b*. For clarity of illustration, the optical coupling configurations 131, 131 are not shown in FIG. 16B. Preferably, the coating 63 covers some or all of the major surface of the film 82*b* (preferably at least the portion of the major surface 83*b* of the film 82*b* associated with the first region 121 of the LOE 120, for example the portion of the film 82*b* that is attached to the first low index material 61) as well as the edges of the film 82*b* and the edges of the low index material (up to the intersection with the major surface 124*b* of the LOE 120). This ensures that the low index material itself is protected from the environment, thereby preventing the low index material from chipping or peeling away from the LOE. In the illustrated example, the capsule 50 is formed from two low index materials 61, 62, and the coating 63 covers the portion of the major surface 83*b* of the film 82*b* associated with the first low index material 61. However, it should be apparent that in certain non-limiting configurations the coating 63 can also be deployed to cover the portion of the major surface 83*b* of the film 82*b* associated with the second low index material 62.

In addition, it should be apparent that the deployment of the coating 63 is also suitable in situations in which a single low index material is used to form the capsule. In such configurations, the coating 63 may be deployed to cover only in the portion of the major surface of the film 82*b* associated with the portion of the low index material associated with the first region 121, or may be deployed to cover the entire major surface of the film 82*b*. It is also noted that although FIGS. 16A and 16B show the coating 63 as having been deployed on the protective film 82*b* that is associated with the major external surface 124*b* that is opposite from the user's eye, the coating 63 can also be deployed on a protective film (that is similar to protective film 82*b*) that is associated with the major external surface 124*a* that is in facing relation to the user's eye (i.e., a protective film that is attached to the low index material that is attached to the major external surface 124*a*, similar, for example, as the film 74*a* illustrated in FIG. 6A). Such deployment of coating 63 on a protective film that is associated with the major external surface 124*b* can be in addition to, or instead of, the deployment of the coating 63 on the film 82*b* that is associated with the major external surface 124*b*, as illustrated in FIGS. 16A and 16B.

Although the at least partially encapsulated compound LOE described herein has pertained to a particular non-limiting configuration of optical coupling configurations, other variant embodiments, employing, for example, differing imaging injection locations and geometries, non-uniform facet spacing, or introducing additional (e.g., third) sets of partially-reflecting internal surfaces, are discussed in detail in prior publications by Lumus Ltd. (Israel), particularly in the aforementioned PCT publication no. WO 2020/049542, as well as PCT publication no. WO 2020/152688 and PCT application number PCT/IL2020/051354. These additional features may all be implemented in the context of the present invention, but for conciseness, they are not addressed here in detail.

Figure 17B:
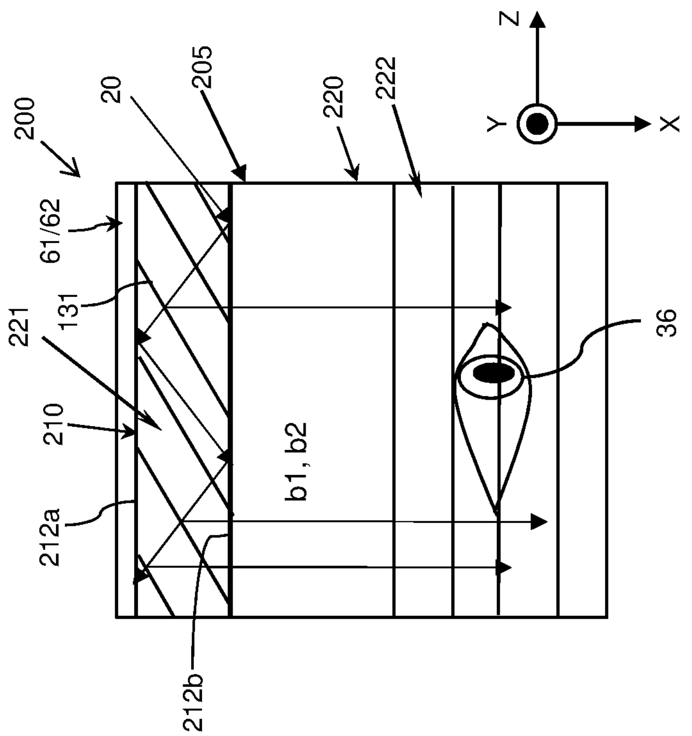
FIGS. 17A and 17B are schematic side and front views, respectively, of an optical device having an LOE configured for performing two-dimensional aperture expansion encapsulated by a capsule formed from first and second transparent materials each having a refractive index lower than the refractive index of the LOE, according to another embodiment of the present invention.
Figure 17A:
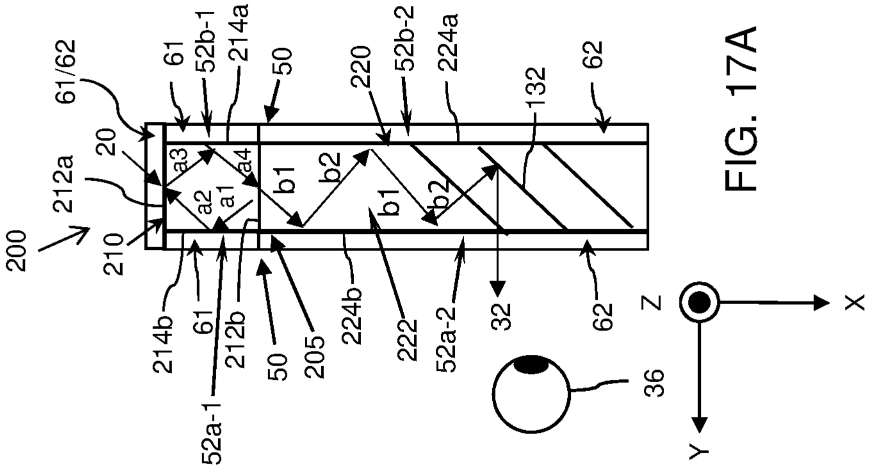

Turning now to FIGS. 17A and 17B, there is illustrated different views of an example of an optical device 200 having an at least partially encapsulated LOE 205 that performs two-dimensional aperture expansion according to another embodiment of the present invention. Here, the LOE 205 is a rectangular substrate-based architecture, and includes in a first region (or LOE section) 221 a first (rectangular) LOE 210 formed as a light-transmitting substrate having a direction of elongation (arbitrarily shown as being along the z-axis) and two pairs of major parallel external surfaces (faces) 212*a*, 212*b*, 214*a*, 214*b* that form a rectangular cross-section. A first optical coupling configuration 131, represented here as a plurality of mutually parallel partially reflective internal surfaces (facets) 131 that at least partially traverse the LOE 210 and are inclined obliquely to the direction of elongation of the LOE 210 (i.e., the facets 131 are oblique to the surfaces 212*a*, 212*b*), functions to deflect image illumination propagating through the LOE 210.

The rectangular LOE 210 is optically coupled with a second slab-type LOE 220, in a second region (or LOE section) 222 of the LOE 205, that is similar in structure to the LOE 12 described with reference to FIGS. 1-2C. Specifically, the LOE 220 is formed as a light-transmitting substrate having a pair of parallel major external surfaces 224*a*, 224*b* that guides image illumination through the LOE 220 by TIR at the surfaces 224*a*, 224*b*, and has a second optical coupling configuration 132, represented here as a plurality of mutually parallel partially reflective internal surfaces 132 that at least partially traverse the LOE 220 and are inclined obliquely to the faces 224*a*, 224*b*. Preferably, the pairs of surfaces 224*a*, 214*a* and 224*b*, 214*b* are each parallel and coplanar such that the surfaces 224*a*, 214*a* form an apparent single surface that is parallel to an apparent single surface formed by the surfaces 224*b*, 214*b*.

The optical coupling between the LOEs 210, 220, and the deployment and configuration of the partially reflective surfaces 131, 132 are such that, when image illumination 20 corresponding to a collimated image is coupled (injected) into the rectangular LOE 210 with an initial direction of propagation at a coupling angle oblique to both pairs of parallel faces 212*a*, 212*b*, 214*a*, 214*b*, the image advances by four-fold total internal reflection (images a1, a2, a3, a4) along the rectangular LOE 210, with a proportion of intensity of the image reflected at the partially reflective surfaces 131 so as to be coupled into the slab-type LOE 220, and then propagates through two-fold total internal reflection (images b1, b1) within the LOE 220, with a proportion of intensity of the image reflected (deflected) at the partially reflective surfaces 132 so as to be directed outwards from one of the parallel faces 224*b* as a visible image 32 seen by the eye 36 of the observer.

It should be understood that the concepts related to at least partial encapsulation of the compound LOEs 120/120', including at least partial encapsulation using a capsule formed from low index material (that can include one or more transparent low index materials, or a transparent low index material that is adjacent to a light-absorbing low index material), attachment of additional optical elements to the low index material(s), deployment of additional coating layers, contour shaping to fit the shape of an eyeglass lens, and other such concepts, all as described above in the context of compound LOEs 120/120', are also applicable here in the context of rectangular-based LOE 205 unless explicitly stated otherwise. Thus, the details of the encapsulation of LOE 205 and the concepts related thereto will not be repeated here, and will only be discussed in general.

Figure 18:
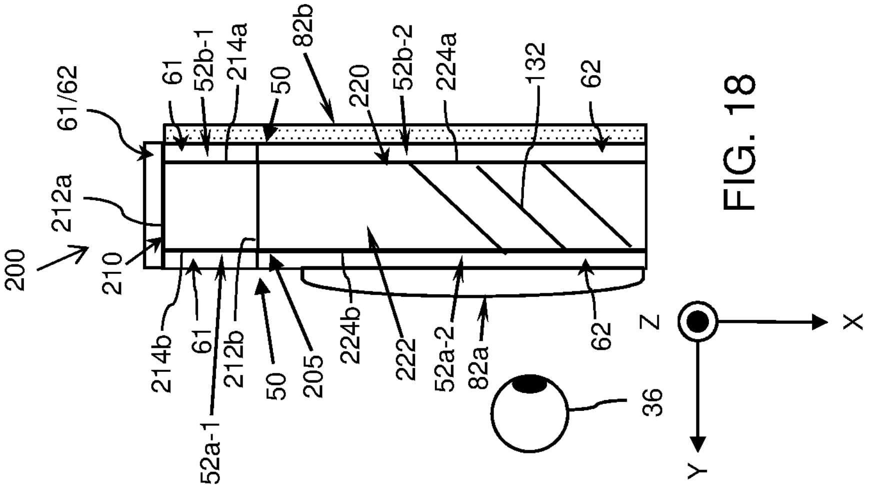
FIG. 18 is a schematic side view of the optical device of FIGS. 17A and 17B, additionally showing a lens and a protective film respectively attached to portions of the first and second surfaces of the capsule, according to embodiments of the invention.

Bearing the above in mind, in general, the capsule 50 which encapsulates the LOE 205 can be formed from a single low index material (that is in direct contact with the surfaces 214*a*, 214*b*, 224*a*, 224*b*) or can be formed from a first low index material that is in direct contact with the surfaces 214*a*, 214*b* and a second low index material that is in direct contact with the surfaces 224*a*, 224*b*). In the drawings, the capsule 50 is shown as being formed from two low index materials 61, 62, where the first low index material 61 is in direct contact with the surfaces 214*a*, 214*b* and the second low index material is in direct contact with the surfaces 224*a*, 224*b*. In certain embodiments, such as the embodiment illustrated in FIG. 18, additional optical elements 82*a*, 82*b* (represented here as a lens and a protective film, respectively) can be deployed in association with the front and back faces of the LOE 205 via direct attachment to relevant portions of the low index material(s) of the capsule 50. In the illustrated example, the lens 82*a* only extends partially along the LOE 205 in the x-dimension such that the lens 82*a* covers the region 222, however similar to as discussed above, the lens 82*a* may extend fully across the surfaces 214*b*, 224*b* in the x-dimension. As should be apparent, any of the combinations of lenses and/or protective films discussed above in the context of LOEs that perform one-dimensional aperture expansion are also applicable here in the context of LOE 205 that performs two-dimensional aperture expansion.

Parenthetically, although FIG. 17A shows a non-limiting example in which the entirety of the major external surfaces 214*a*, 214*b* of the rectangular LOE 210 have the first low index material 61 attached thereto, and the entirety of the major external surfaces 224*a*, 224*b* of the slab-type LOE 220 have the second low index material 62 attached thereto, other configurations are possible. For example, the first low index material 61 may extend down (further along the x-axis) so as to also be attached to minority portions of the major external surfaces 224*a*, 224*b* of slab-type LOE 220 (located in the "upper" portion of the slab-type LOE 220 that is proximate to the coupling between the two LOEs 210, 220).

Figure 19:
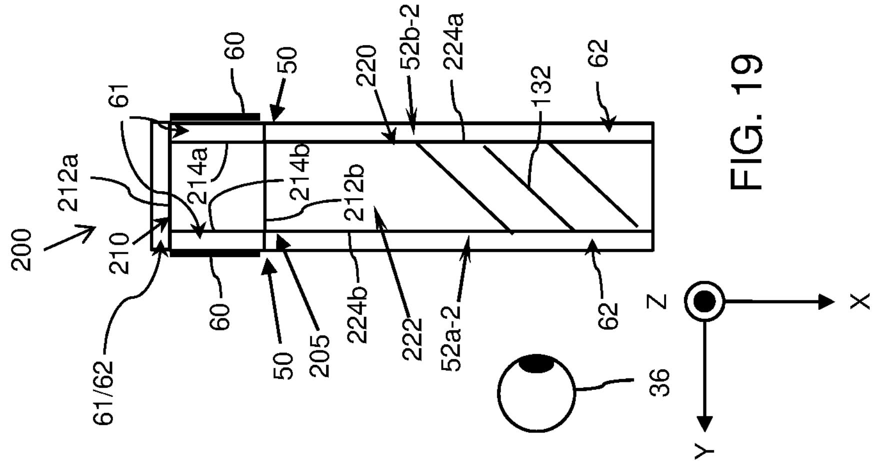
FIG. 19 is a schematic side view of the optical device of FIGS. 17A and 17B, additionally showing a light-absorbing material associated with portions of the first transparent material of the capsule, according to embodiments of the present invention.

In certain embodiments, such as the embodiment illustrated in FIG. 19, light-absorbing material 60 can be deployed in association with the low index material that is in contact with the first region 221 (i.e., the low index material that is in contact with the surfaces 214*a*, 214*b* of the rectangular LOE 210). In other embodiments, the low index material that is in contact with the surfaces 214*a*, 214*b* (e.g., the low index material 61 in FIG. 17A) can be implemented as a light-absorbing material having a low refractive index, such as black paint with inherently low refractive index. Although not illustrated in the drawings, an additional coating (e.g., AR, black paint) can be applied to a protective film attached to the low index material in the first region 221 of the LOE 205, similar to as illustrated in FIGS. 16A and 16B.

It is noted that one aspect of encapsulation of the LOE 205 that may be different from the encapsulation of LOE 120/120' relates to the surfaces 212*a*, 212*b*. In general, for all of the LOEs disclosed herein, the optical properties of any pair major external surfaces that reflect illumination by TIR should be the same. Since the rectangular LOE 210 guides light by four-fold total internal reflection, the optical properties of the opposing surfaces 212*a*, 212*b* should be the same such that illumination that impinges at the surfaces 212*a*, 212*b* at a given angle is reflected to the same angle by the surfaces 212*a*, 212*b*. Thus, if the low index material of the capsule 50 is also directly attached to the surface 212*a* (such as low index material 61 or 62 illustrated in FIGS. 17A-19), care should be taken to ensure that the matching optical properties of the opposing surfaces 212*a*, 212*b* are preserved such that the range of angles reflected by TIR at the surface 212*b* is the same range of angles reflected by TIR at the surface 212*a*.

In certain embodiments, the general steps for producing optical devices having an encapsulated rectangular LOE based arrangement are similar to those used for producing optical devices having encapsulated compound LOEs and LOEs that perform one-dimensional aperture expansion. In such embodiments, these steps generally include obtaining the rectangular LOE based arrangement (i.e., obtaining LOE 205), and then encapsulating the LOE 205 by directly attaching the low index material to the major external surfaces 214*a*, 214*b* (and preferably also the surface 212*a*) of the LOE 210 and the major external surfaces 224*a*, 224*b*. Obtaining the LOE may, in certain embodiments, include fabricating the LOE 205. Methods for fabricating encapsulated rectangular LOE based arrangement have been described extensively in various publications by Lumus Ltd. (Israel), including, for example, in the aforementioned U.S. Pat. No. 10,133,070, and in co-pending PCT application no. PCT/IL2022/050500. In certain embodiments, the encapsulation step may be performed as an additional step of the LOE fabrication process.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical device for directing image illumination towards a user for viewing, the optical device comprising:

a light-guide optical element (LOE) formed from a light-transmitting material having a first refractive index, the LOE including:

a plurality of surfaces including a pair of parallel major external surfaces for guiding image illumination within the LOE by total internal reflection at the major external surfaces, a first region and a second region, a first optical coupling configuration located in the first region and a second optical coupling configuration located in the second region, the first optical coupling configuration for deflecting a part of the image illumination that is guided within the first region by total internal reflection at the major external surfaces towards the second region, and the second optical coupling configuration configured for deflecting a part of the image illumination that is guided within the LOE by total internal reflection at the major external surfaces from the first to the second region out of the LOE towards the user;

an optical material including at least one transparent material directly attached to the LOE at least at the major external surfaces so as to be in direct contact with the major external surfaces at least at the first region and so as to at least partially encapsulate the LOE, the optical material having a second refractive index that is less than the first refractive index so as to maintain conditions of total internal reflection at the major external surfaces; and a light-absorbing material covering one or more portions of the at least one transparent material, wherein the one or more portions of the at least one transparent material are directly attached to, and cover, at least part of at least one of the major external surfaces in the first region of the LOE.

2. The optical device of claim 1, wherein the at least one transparent material is formed from a solid-state material.

3. The optical device of claim 1, wherein the at least one transparent material is formed from one or more layers of optical adhesive.

4. The optical device of claim 1, wherein the at least one transparent material is a thin coating layer of a polymer or dielectric material.

5. The optical device of claim 1, wherein the optical material has a thickness that is sufficiently small such that surface patterns of the optical material follow blemish patterns at the major external surfaces.

6. The optical device of claim 1, wherein the first optical coupling configuration is implemented as a first plurality of mutually parallel partially reflecting surfaces having a first orientation, and wherein the second optical coupling configuration is implemented as a second plurality of mutually parallel partially reflecting surfaces having a second orientation that is non-parallel to the first orientation.

7. The optical device of claim 1, wherein the first optical coupling configuration is implemented as a first at least one diffractive element associated with one of the major external surfaces, and wherein the second optical coupling configuration is implemented as a second at least one diffractive element associated with one of the major external surfaces.

8. The optical device of claim 1, wherein the light-absorbing material has a refractive index that is equal to the first refractive index or no more than 10% greater than the first refractive index.

9. The optical device of claim 1, further comprising:

at least one optical element attached to the at least one transparent material, wherein the at least one optical element includes:

a lens attached to a first portion of the at least one transparent material that is directly attached to a first of the major external surfaces, and a protective film attached to a second portion of the at least one transparent material that is directly attached to a second of the major external surfaces, wherein the first portion and the second portion of the at least one transparent material overlie the second region of the LOE.

10. The optical device of claim 1, further comprising:

at least one optical element attached to the at least one transparent material, wherein the at least one optical element includes:

a first lens attached to a first portion of the at least one transparent material that is directly attached to a first of the major external surfaces, and a second lens attached to a second portion of the at least one transparent material that is directly attached to a second of the major external surfaces, wherein the first portion and the second portion of the at least one transparent material overlie the second region of the LOE.

11. The optical device of claim 1, further comprising:

at least one optical element attached to the at least one transparent material, wherein the at least one optical element includes:

a first protective film attached to a first portion of the at least one transparent material that is directly attached to a first of the major external surfaces, and a second protective film attached to a second portion of the at least one transparent material that is directly attached to a second of the major external surfaces, wherein the first portion and the second portion of the at least one transparent material overlie the second region of the LOE.

12. The optical device of claim 1, wherein the LOE is a pre-cut LOE that is cut from a precursor LOE prior to the optical material being directly attached to the LOE such that the LOE includes substantially only an active area in which the image illumination propagates, and wherein one or more perimeter edges of the LOE are coated with at least one layer of opaque material.

13. An optical device for directing image illumination towards a user for viewing, the optical device comprising:

a light-guide optical element (LOE) formed from a light-transmitting material having a first refractive index, the LOE including:

a plurality of surfaces including a pair of parallel major external surfaces for guiding image illumination within the LOE by total internal reflection at the major external surfaces, a first region and a second region, a first optical coupling configuration located in the first region and a second optical coupling configuration located in the second region, the first optical coupling configuration for deflecting a part of the image illumination that is guided within the first region by total internal reflection at the major external surfaces towards the second region, and the second optical coupling configuration configured for deflecting a part of the image illumination that is guided within the LOE by total internal reflection at the major external surfaces from the first to the second region out of the LOE towards the user; and an optical material including at least one transparent material directly attached to the LOE at least at the major external surfaces so as to be in direct contact with the major external surfaces at least at the first region and so as to at least partially encapsulate the LOE, the optical material having a second refractive index that is less than the first refractive index so as to maintain conditions of total internal reflection at the major external surfaces, wherein the optical material has a thickness that is sufficiently small such that surface patterns of the optical material follow blemish patterns at the major external surfaces.

14. The optical device of claim 13, wherein the thickness is in a range from 2 μm to 20 μm.

* * * * *